(12) United States Patent
Veljkovic et al.

(10) Patent No.: US 6,257,126 B1
(45) Date of Patent: Jul. 10, 2001

(54) FOOD GRILL ASSEMBLY

(75) Inventors: Anton Veljkovic, St. Louis; Theodore A. Surgant; Philip M. Ranft, both of Ballwin, all of MO (US)

(73) Assignee: Star Manufacturing International Inc., St. Louis, MO (US)

( * ) Notice: Subject to any disclaimer, the term of this patent is extended or adjusted under 35 U.S.C. 154(b) by 0 days.

(21) Appl. No.: 09/672,654

(22) Filed: Sep. 28, 2000

Related U.S. Application Data
(60) Provisional application No. 60/156,659, filed on Sep. 29, 1999.

(51) Int. Cl.[7] .............................. A47J 37/00; A47J 37/06; A47J 37/08
(52) U.S. Cl. ................ 99/349; 99/353; 99/372; 99/379; 99/385; 99/389
(58) Field of Search ............................ 99/326–335, 337, 99/338, 349–351, 353–355, 372–379, 385, 389–391, 400, 401, 444–450, 339, 340; 219/521, 537, 585, 492, 494; 100/92, 305; 426/520, 523, 512

(56) References Cited

U.S. PATENT DOCUMENTS

| | | | |
|---|---|---|---|
| 3,880,064 | * 4/1975 | Martinex | 99/349 |
| 4,571,775 | 2/1986 | Leonard | 16/298 |
| 4,972,766 | * 11/1990 | Anetsberger | 99/332 |
| 5,205,074 | 4/1993 | Guhl et al. | 49/386 |
| 5,253,391 | 10/1993 | Ojima | 16/289 |
| 5,473,976 | * 12/1995 | Hermansson | 99/349 |
| 5,531,155 | * 7/1996 | Pellicane et al. | 99/372 |
| 5,555,794 | * 9/1996 | Templeton et al. | 99/349 |
| 5,613,308 | 3/1997 | Little | 37/445 |
| 5,655,434 | * 8/1997 | Liebemann | 99/353 |
| 5,676,046 | * 10/1997 | Taber et al. | 99/340 |
| 5,755,152 | * 5/1998 | Matsumoto et al. | 99/372 |
| 5,771,782 | * 6/1998 | Taber et al. | 99/385 X |
| 5,802,958 | * 9/1998 | Hermansson | 99/379 X |
| 5,839,359 | * 11/1998 | Gardener | 99/349 |
| 5,881,634 | * 3/1999 | Newton | 99/379 X |
| 5,890,419 | * 4/1999 | Moravec | 99/349 |

OTHER PUBLICATIONS

Lang Gas Clamshell Product Brochure, Sep. 1993.
Lang Electric Clamshell Product Brochure, Apr. 1995.
Lang Electric Clamshell with Slider Hood Product Brochure, Dec. 1994.
Star Split Lid Table Top Clam Shell Toaster Model GR 138TB2 120V Installation and Operating Instructions, Oct. 27, 1998.
Star Two Sided Grills Installations and Operating Instruction, Aug. 10, 1999.
Star Model GR138TB 120V Schematic showing an exploded view, Dec. 1, 1997. This unit was sold in the U.S. prior to Sep. 29, 1999.
CounterBalance Product Brochure, Oct. 7, 1998.

* cited by examiner

Primary Examiner—Timothy F. Simone
(74) Attorney, Agent, or Firm—Polster, Lieder, Woodruff & Lucchesi, L.C.

(57) ABSTRACT

A food grill assembly for cooking a food product is disclosed which comprises a base, a lower platen ensemble associated with the base, the lower platen ensemble having a heat source and a surface upon which a food product to be cooked is placed, the lower platen ensemble further comprising a back wall and a pair of side walls which are integral with the lower platen ensemble with the walls forming a splash guard, an upper platen ensemble having a heat source, the upper platen ensemble having a surface which is adapted to be in contact with a food product to be cooked, a counterbalance assembly connected to the base, and a handle mechanism connected to the counterbalance assembly and the upper platen ensemble for providing pivoting movement of the upper platen assembly relative to the base, the counterbalance assembly for leveling the upper platen assembly relative to the lower platen assembly when the upper platen assembly is within a predetermined distance from the lower platen assembly.

20 Claims, 13 Drawing Sheets

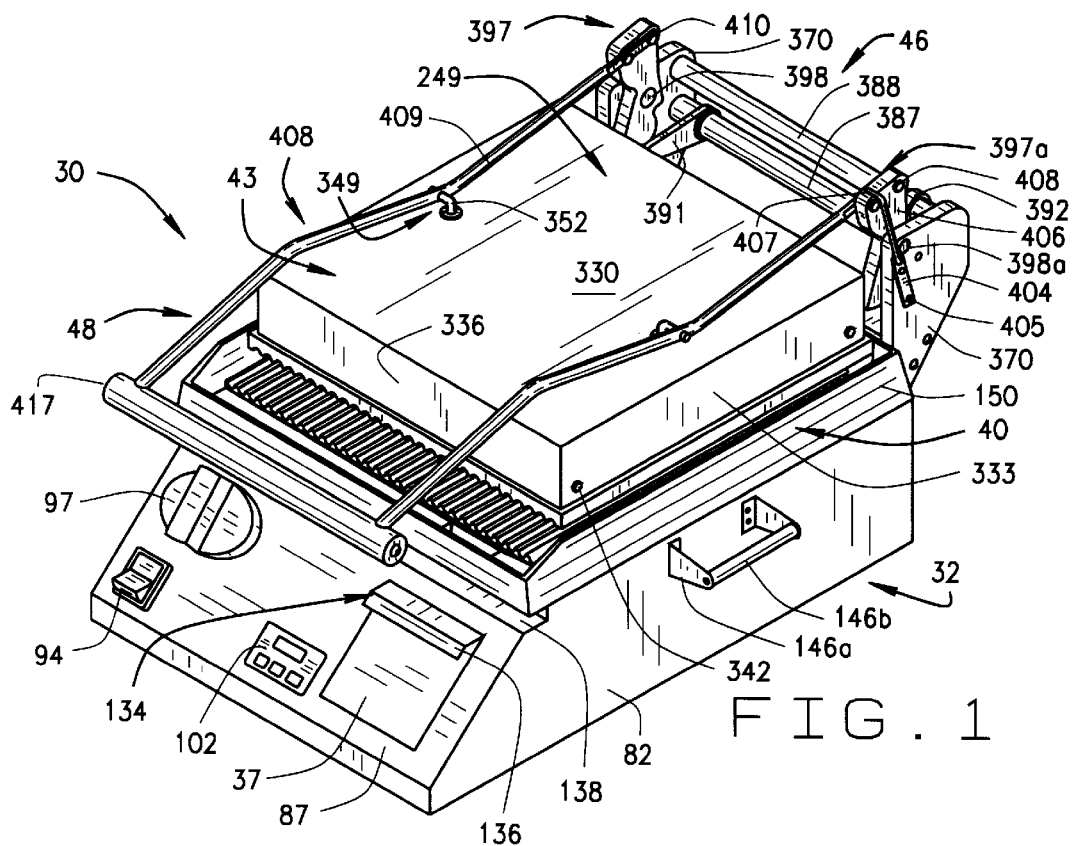
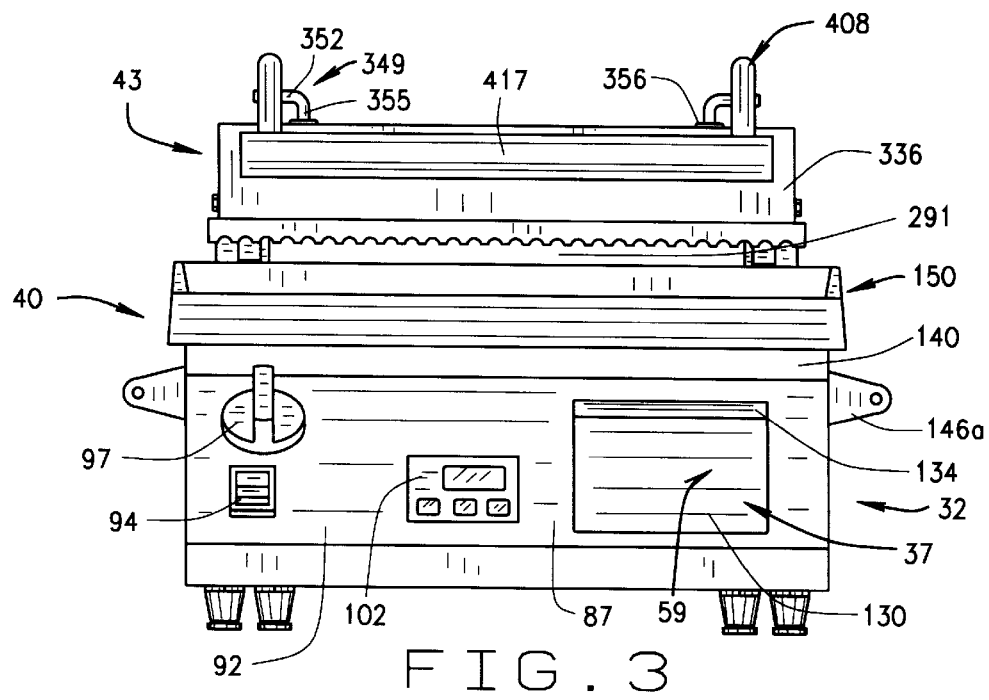

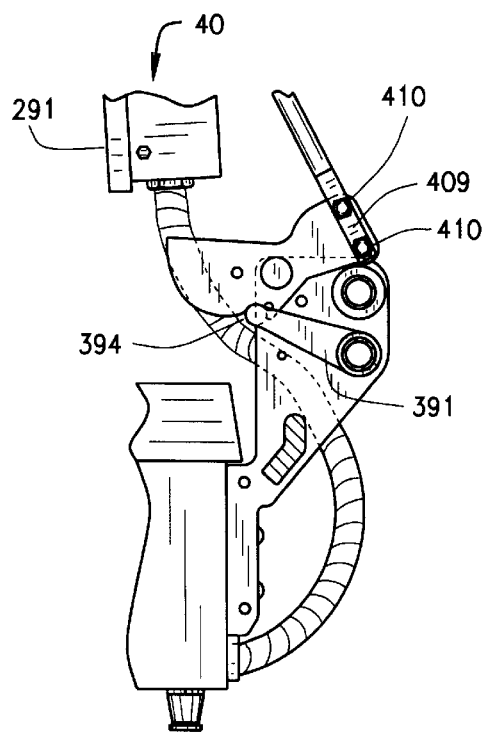
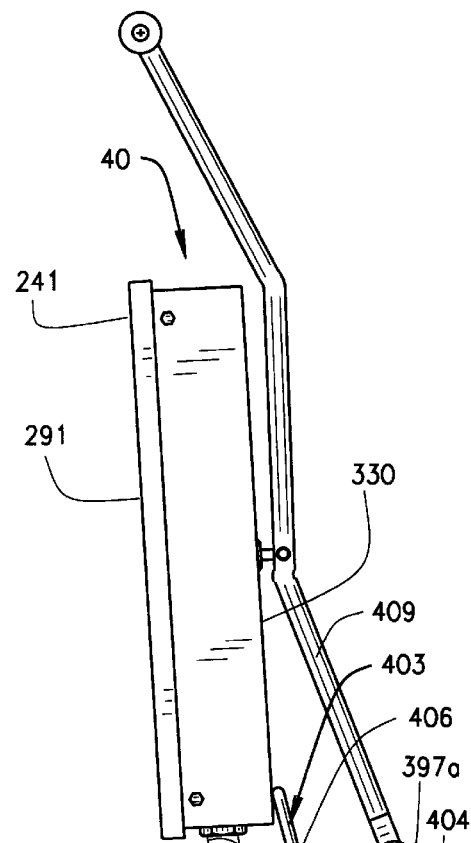
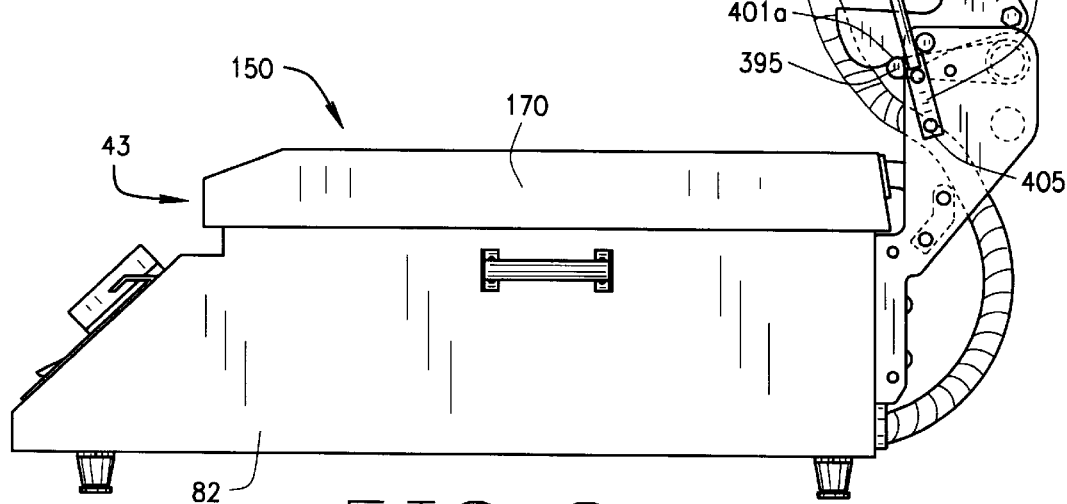
FIG. 9A
FIG. 9

FOOD GRILL ASSEMBLY

CROSS REFERENCE TO RELATED APPLICATIONS

This application is based on U.S. Provisional Application No. 60/156,659, which was filed on Sep. 29, 1999.

STATEMENT REGARDING FEDERALLY SPONSORED RESEARCH OR DEVELOPMENT

Not applicable.

BACKGROUND OF THE INVENTION

This invention relates to a food grill assembly, and more particularly, a food grill assembly that is capable of cooking food products having different thicknesses.

Food grill assemblies are used in commercial establishments to quickly cook food products for customers. Some food grill assemblies typically have a heating surface upon which the food products are placed and a second heat source which is pivotal relative to the heating surface and is positioned above the food product. In this manner, the food product is placed on the heating surface and the second heat source is pivoted into place over the food product. The food grill assembly is then able to quickly cook the food product. The second heat source is far enough above the food product that it is not in contact with the food. In this situation, the topside of the food product may not be cooked as well or as thoroughly as the bottom side. It may be required to turn or flip the food product in order to cook the product thoroughly or evenly on both sides. This adds to the time that it takes to cook and serve the food product to the customer. Further, because of the construction of these food grill assemblies it is difficult to cook food products having varying or different thichnesses. For example, it may be desirable to cook a relatively thin and flat food product, such as a tortilla, at one point in time, while it may then be desirable to cook a relatively thick food product, such as a chicken breast. In such situation the known food grill assemblies are not capable of being adjusted to compensate for food products having different thicknesses.

In order to pivot the second heat source, some food grill assemblies have a hinge mechanism which only provides for the second heat source to be moved in an open or a closed position. Such mechanisms do not provide for any intermediate positioning of the second heat source. Additionally, the second heat source is typically heavy in weight and this causes the hinge mechanism to wear out over time. This could lead to a dangerous situation in which an operator of the food grill assembly could assume that the second heat source will stay in the open position only to have the hinge mechanism fail and fall onto the hand of the operator. Further, since these hinge mechanisms are constructed from metal, it is also possible that metal shavings due to the wear of the mechanism could get into the food that is being cooked.

Some known types of sources are quartz type heating devices. Such quartz heating devices are exposed to the food being cooked and as a result of this tend to be covered by food matter during or after the cooking process. It is then necessary to clean the quartz heating devices. Additionally, it is also possible that these quartz devices may break during use and need to be replaced, which takes away from the time the grill assembly could be cooking food for customers.

When a food grill assembly needs to be cleaned, one typical cleaning method is to hose off the assembly with water. One problem associated with using this procedure is that water is allowed to enter the area within which the heating element and the electrical wires are housed. If this occurs over time, the heating element may wear out prematurely and will have to be replaced. Therefore, it is important to prevent any water from leaking into the assembly.

Another problem associated with the use of food grill assemblies is how to capture and store any grease that is produced during cooking. Known food grill assemblies have had grease trays which were located in the back of the assembly which made it difficult to see how full the tray was or made it difficult to remove the tray. Other known food grill assemblies have had grease trays located at the front of the assembly, however, such trays were exposed which caused problems during cooking.

It has also been found that the heating elements which are used to heat the cooking surfaces are not efficient. For example, a heating element may heat one section of the cooking surface at a higher temperature than another section. This leads to uneven cooking of food products and increases the time required to cook food products. It would be advantageous to provide a heating element which could evenly heat the cooking surface and reduce or eliminate any heat differential along the cooking surface.

The present invention is designed to obviate and overcome many of the disadvantages and shortcomings experienced with the food grill assemblies discussed hereinbefore and with other food grill assemblies used in the past, and to provide a food grill assembly which can be easily utilized to cook food. Moreover, the food grill assembly of the present invention is more advantageous than the food grill assemblies previously used in that it is capable of cooking foods that have different thicknesses, is easy to clean, and is capable of easily capturing grease and water.

SUMMARY OF THE INVENTION

In one form of the present invention, a food grill assembly for cooking a food product is disclosed which comprises a base, a lower platen ensemble associated with the base, the lower platen ensemble having a heat source and a surface upon which a food product to be cooked is placed, the lower platen ensemble further comprising a back wall and a pair of side walls which are integral with the lower platen ensemble with the walls forming a splash guard, an upper platen ensemble having a heat source, the upper platen ensemble having a surface which is adapted to be in contact with a food product to be cooked, a counterbalance assembly connected to the base, and a handle mechanism connected to the counterbalance assembly and the upper platen ensemble for providing pivoting movement of the upper platen assembly relative to the base, the counterbalance assembly for leveling the upper platen assembly relative to the lower platen assembly when the upper platen assembly is within a predetermined distance from the lower platen assembly.

In another form of the present invention, a food grill assembly for cooking a first food product having a first thickness and a second food product having a second thickness comprises a base, a lower platen ensemble associated with the base, the lower platen ensemble having a heat source and a surface upon which a food product to be cooked is placed, an upper platen ensemble having a heat source, the upper platen ensemble having a surface which is adapted to be in contact with a food product to be cooked, a counterbalance assembly connected to the base, a handle mechanism connected to the counterbalance assembly and the upper platen ensemble for providing pivoting movement of the upper platen assembly relative to the base between a first position which is capable of cooking a first food product having a first thickness and a second position which is capable of cooking a second food product having a second thickness, and a stop connected to the counterbalance assembly, the stop for limiting pivoting movement of the upper platen ensemble.

In still another form of the present invention, a food grill assembly for cooking two or more food products comprises a base, a lower platen ensemble associated with the base, the lower platen ensemble having a heat source and a surface upon which a food product to be cooked is placed, a back wall and a pair of side walls which are integral with the lower platen ensemble with the walls forming a splash guard, a first upper platen ensemble having a heat source, the first upper platen ensemble having a surface which is adapted to be in contact with a food product to be cooked, a second upper platen ensemble having a heat source, the second upper platen ensemble having a surface which is adapted to be in contact with a food product to be cooked, a first counterbalance assembly connected to the base, a second counterbalance assembly connected to the base, a first handle mechanism connected to the first counterbalance assembly and the first upper platen ensemble for providing pivoting movement of the first upper platen assembly relative to the base, and a second handle mechanism connected to the second counterbalance assembly and the second upper platen ensemble for providing pivoting movement of the second upper platen assembly relative to the base.

In light of the foregoing comments, it will be recognized that a principal object of the present invention is to provide an improved food grill assembly.

Another object of the present invention is to provide a food grill assembly which is of simple construction and design and which can be easily employed with highly reliable results.

A further object of the present invention is to provide a food grill assembly which is capable of cooking foods which have different thicknesses.

A still further object of the present invention is to provide a food grill assembly in which both sides of a food product are in contact with a heat source to reduce the time it takes to thoroughly and evenly cook the food product.

Another object of the present invention is to provide a food grill assembly which has a construction to resist and block water from entering into the assembly.

A further object of the present invention is to provide a food grill assembly which has a lower grill platen having structure, preferably integral walls which protect against grease or water splashing out of the assembly and an integral trough for capturing grease or water.

These and other objects and advantages of the present invention will become apparent after considering the following detailed specification in conjunction with the accompanying drawings, wherein:

BRIEF DESCRIPTION OF THE DRAWINGS

FIG. 1 is an orthogonal projection of the food grill assembly constructed according to the present invention;

FIG. 3 is a front elevation of the assembly of FIG. 1;

FIG. 9 is a side elevation similar to that of FIG. 7, but showing the upper platen assembly in the fully raised position;

FIG. 9A is a side section similar to that of FIG. 9, but taken in partial section as to the counterbalance assembly, to better illustrate the counterbalance assembly structure toward the left side of FIG. 1, with the upper platen assembly in the same position as in FIG. 9;

Corresponding reference characters indicate corresponding parts throughout the several views of the drawings.

DESCRIPTION OF PREFERRED EMBODIMENT

Figure 2:
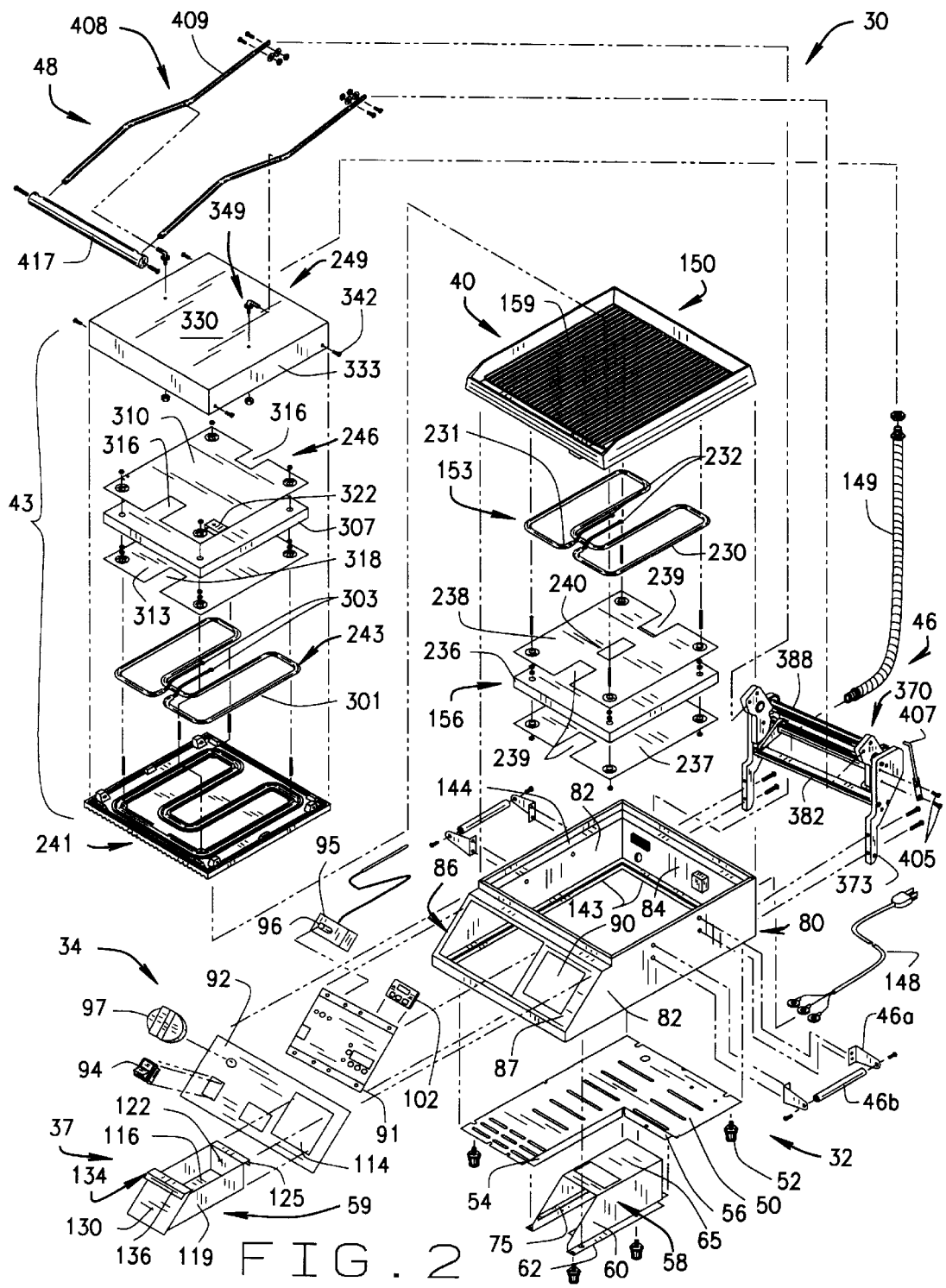
FIG. 2 is an exploded view of the food grill assembly of FIG. 1, with some parts not shown.

The following detailed description illustrates the invention by way of example and not by way of limitation. This description will clearly enable one skilled in the art to make and use the invention, and describes several embodiments, adaptations, variations, alternatives and uses of the invention, including what we presently believe is the best mode of carrying out the invention. As various changes could be made in the above constructions without departing from the scope of the invention, it is intended that all matter contained in the above description or shown in the accompanying drawings shall be interpreted as illustrative and not in a limiting sense.

Referring now to the drawings, wherein like numerals refer to like items, number identifies a preferred embodiment of a food grill assembly 30 constructed according to the present invention. With particular reference to FIGS. 1–4, 6, and 10, the food grill assembly 30 comprises a lower base housing 32 which houses a control sub-assembly 34 and a drip tray sub-assembly 37. Above the lower base housing 32 is mounted a lower platen ensemble 40. An upper platen ensemble 43 is located above the lower platen ensemble 40. A counterbalance assembly 46 is mounted to the rear of the lower base housing 32. Pivotally connected to the topside of the upper platen assembly 43 is a pivot handle sub-assembly 48, with the sub-assembly 48 also being rigidly connected at its rear ends to the top part of the counterbalance assembly 46. The lower base housing 32 can be made of metal such as stainless steel.

Figure 6:
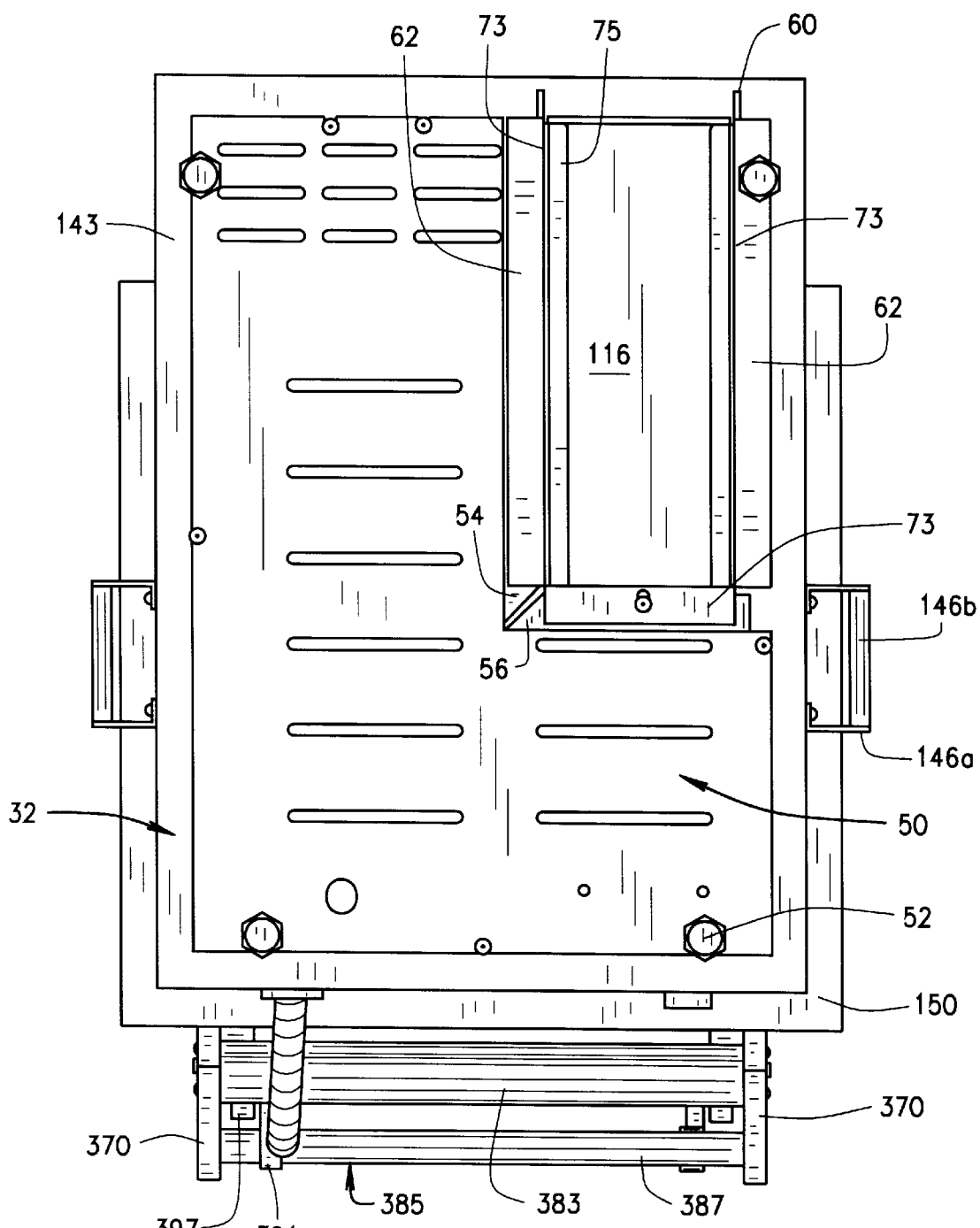
FIG. 6 is a bottom plan view of the assembly of FIG. 1.
Figure 11:
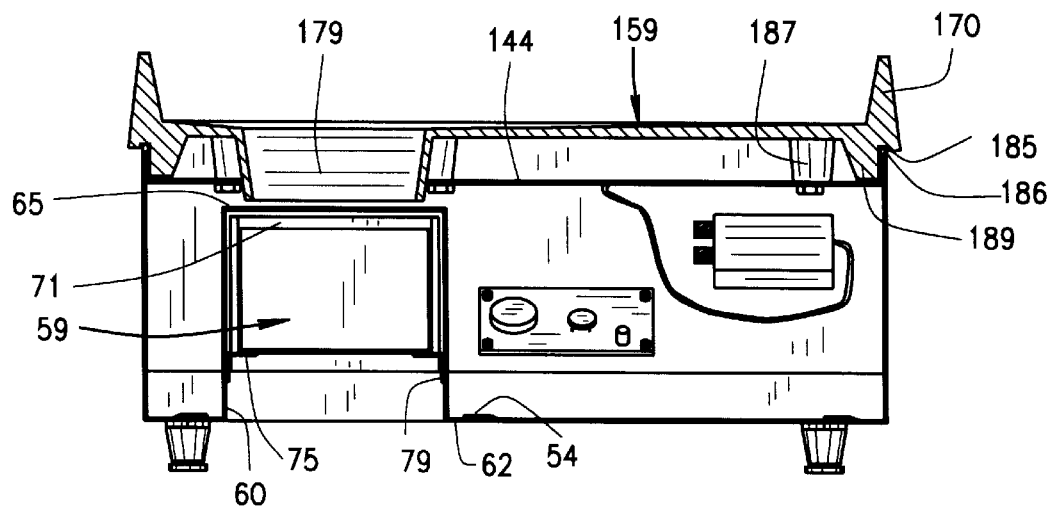
FIG. 11 is a section of part of the assembly of FIG. 1 taken along the plane of line 11—11 of FIG. 5, showing only the lower platen assembly and the base housing.
Figure 12:
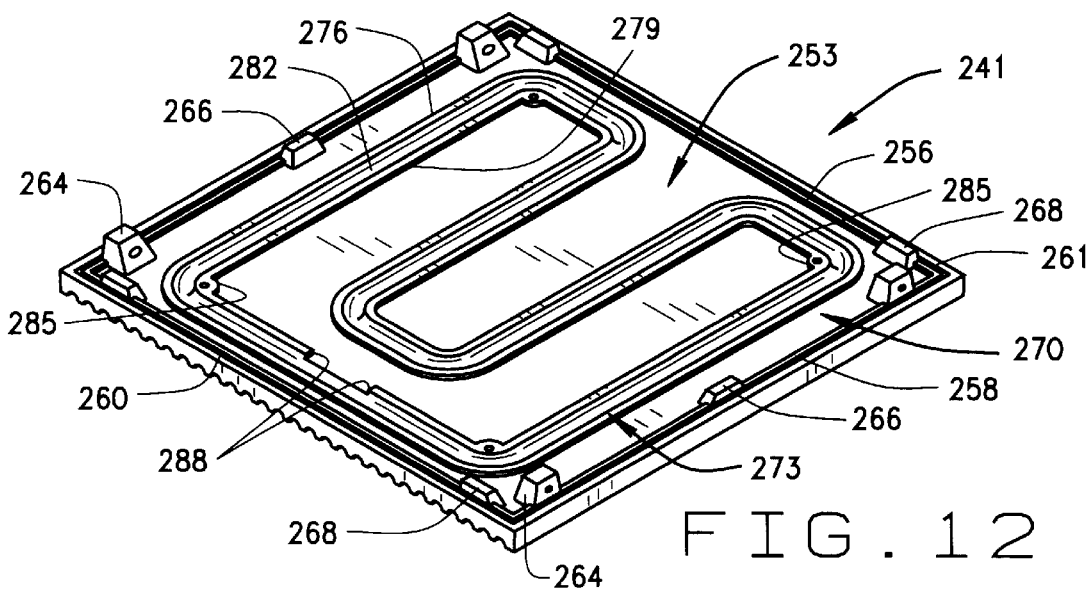
FIG. 12 is an isolated orthogonal projection view looking toward the top side of the upper platen.

Referring now to FIG. 2, the housing 32 has a floor wall 50 that can be formed of a single piece of metal, such as alumninized steel or stainless steel plating. The floor 50 is supported by four screw-in rubber legs 52 with the legs 52 being height adjustable. The floor 50 also has a plurality of vent holes extending therethrough. Floor 50 has a general L-shape, with a rectangular recess towards a forward front corner, with offset horizontal flanges 54 and 56 extending from the edges thereof slightly offset in an upward direction, thence extending horizontally, as seen in FIGS. 2, 6 and 11. Floor 50 can be press stamped from a single piece of metal, such as stainless steel.

The drip tray sub-assembly 37 includes a drip tray housing 58 and a drip tray 59 which is slidingly housed therein. The drip tray housing 58 is secured to the floor 50. Tray housing 58, as seen in FIGS. 2, 6 and 11 in particular, has a generally inverted U-shaped cross section, with sidewalls 60 that have horizontal flanges 62 extending outwardly therefrom. The inside flange 62 is secured to floor flange 54 as by screws, while the exterior flange 62 is secured, as by screws, to a lower flange extending horizontally from an adjacent housing sidewall, as will be described. The front edges of the sidewalls 60 have a vertical section that extends into a rearwardly slanting section. Tray housing 58 has a horizontal ceiling wall 65 integrally connected to the top edges of the sidewalls 60. The ceiling wall 65 has a rectangular drip inlet opening 68 through which drippings can pass into the drip tray 59. The tray housing 58 has a rear wall 71 integrally connected to the rear edges of sidewalls 60 and ceiling 65. Wall 71 has a lower outwardly extending flange 73 that is secured to the rear floor flange 56 as by a screw.

On the inside of each of the tray housing sidewalls 60 are angled slide members as seen in FIGS. 2, 6 and 11, which have their vertical legs 74 secured as by spot welding to the inside of walls 60, while their horizontal legs 75 project inwardly to slidingly support the drip tray 59.

The base housing 32 further comprises an upstanding vertical wall casing 80, which can be of metal such as stainless steel. As seen clearly in FIG. 2, the casing 80 comprises two upstanding sidewalls 82, an integral rear wall 84, and a front wall 86. Front wall 86 has a sloped section 87 having a larger rectangular opening 88 and a smaller square opening 90. A mount plate 91 which can be of metal such as stainless steel, is located behind sloped wall 87 so as to cover the larger rectangular opening 88. Plate 91 is secured as by screws to sloped front wall section 87. A decal 92, which can have decorative markings, trademarks and functional language, is attached to the front of sloped front wall section 87. Decal 92 covers mount plate 91, but decal 92 has a hole the same size as cover opening 90 so as not to cover opening 90.

Parts of the control assembly 34 are mounted to plate 91. The control assembly 34 comprises a toggle switch 94 and a thermostat control box 95 which are both mounted to the left of plate 91. The plate 91 and decal 92 each have a circular opening that receives a rod 96 from the thermostat control box 95 which is positioned to the rear side of plate 91. A rotatable knob 97 is located to the outside of plate 91 and receives rod 96. Control box 95 is connected to a sensor tube 99 which is mounted with the lower platen sub-assembly 40, as will be described. The control box 95 and sensor 99 can be such as available from Invensys Appliance Control, New Stanton, Pa. 15672, having Model No. K-10-18. The sensor 99 may be a resistance temperature device that provides for accurate sensing of temperature.

The control system 34 further comprises a timer 102 mounted to the rear side of plate 91, with its controls and digital display viewable through openings in plate 91. Timer 102 can be a timer such as available from Electronic Controls Corporation, 11022 Via El Mercado, Los Alamitos, Calif. 90720.

Figure 5:
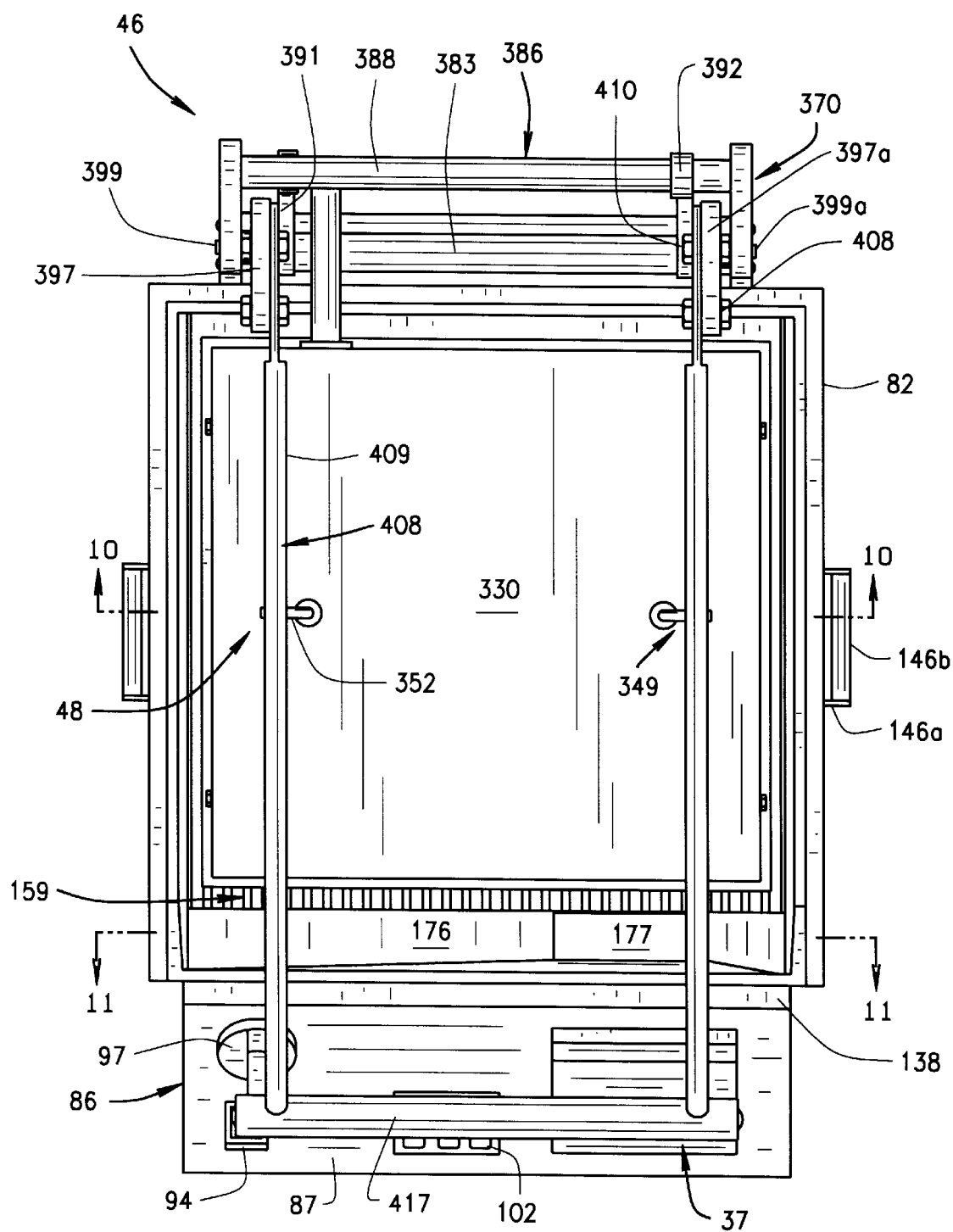
FIG. 5 is a top plan view of the assembly of FIG. 1.
Figure 7:
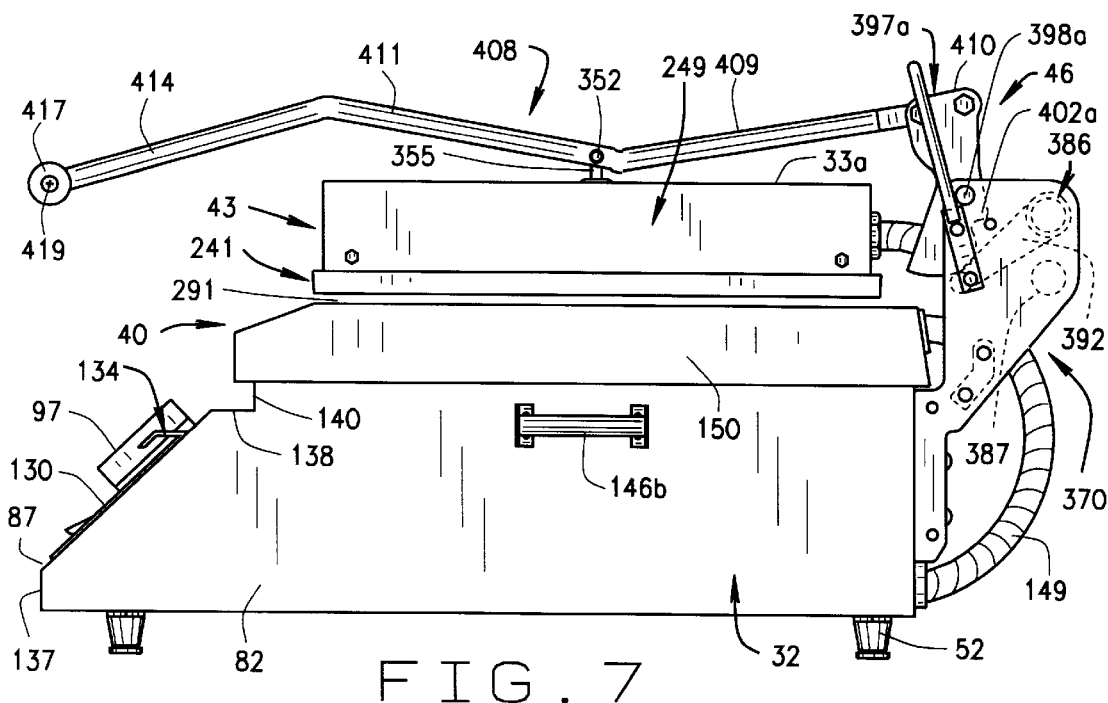
FIG. 7 is a side elevation of the assembly of FIG. 1, with parts of the counterbalance assemblies shown broken or with hidden lines, taken viewing the right side of FIG. 1, and showing the upper platen subassembly in a lowered position for cooking food.
Figure 8:
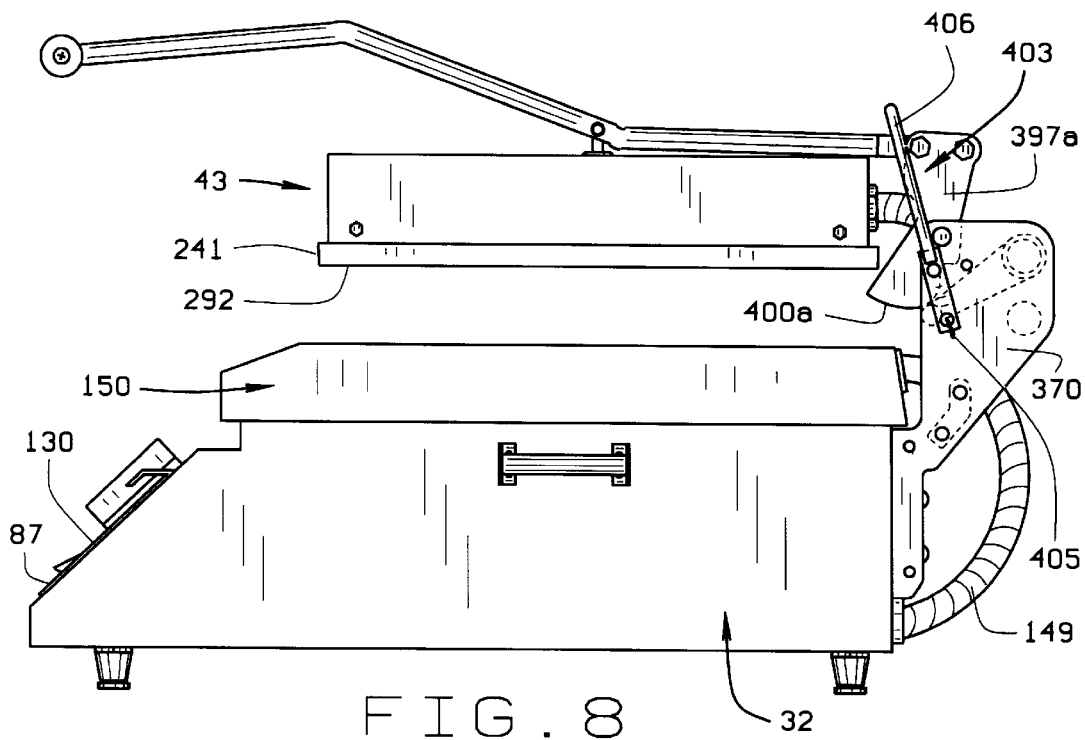
FIG. 8 is a side elevation similar to FIG. 7, with parts of the counterbalance assemblies shown broken, but showing the upper platen raised higher than in FIG. 7 for cooking thicker food products.

The drip tray 59 is sized so that its rearward portion can pass through a square opening 114 in decal 92. Opening 114 is approximately the same size as the smaller square opening 90 in wall 86. As can be appreciated, the drip tray 59 can be constructed of stainless steel. Tray 59 comprises a bottom wall 116 which extends integrally into two sidewalls 119, as well as into an integral, upright rear wall 122. An integral angled grip flange 125 projects from the top of rear wall 122. The drip tray floor 116, sidewalls 119 and rear wall 122 with flange 125 can be press stamped from a single sheet of metal, such as stainless steel. Tray 59 further has a sloped front face wall 130 which has an area larger than that of the holes 114 and 90 so that it cannot pass therethrough. The inside of front wall 130 is secured as by spot welding to the sloped front edges of the walls 119 and to the front edge of tray bottom wall 116. The face wall 130 extends at its top into an integral angled handle flange 134 whose front plate section 136 is spaced from front wall 130 so that the fingers of an operator can extend therebehind to pull the tray 59 away from front panel 94. When the drip tray 59 is fully inserted into the base housing 32 to the position shown in FIGS. 1, 3 and 5, the inside surface of the tray front wall plate 130 rests flush against the adjacent front surface of decal 92 and sloped wall section 87, as can be seen in FIGS. 7 and 8, to block further inward movement of the tray 59. When the tray 59 is inserted through the openings 90 and 114 into the tray housing 58, the outer edges of the tray bottom wall 116 rest upon the inwardly extending flanges 75 to be supported thereby to slide in and out thereon to and from the filly inserted position of FIGS. 1, 3, and 5.

Referring now to FIG. 7, the front sloped wall section 87 of base housing 32 extends from its bottom into a vertical section 137. At its top edge, wall 87 extends rearwardly and horizontally into a flat mezzanine wall 138 which thence extends into a vertical mezzanine wall 140, both of which join with the sidewalls 82. A notch-like opening is formed along the edges of walls 138 and 140.

Figure 4:
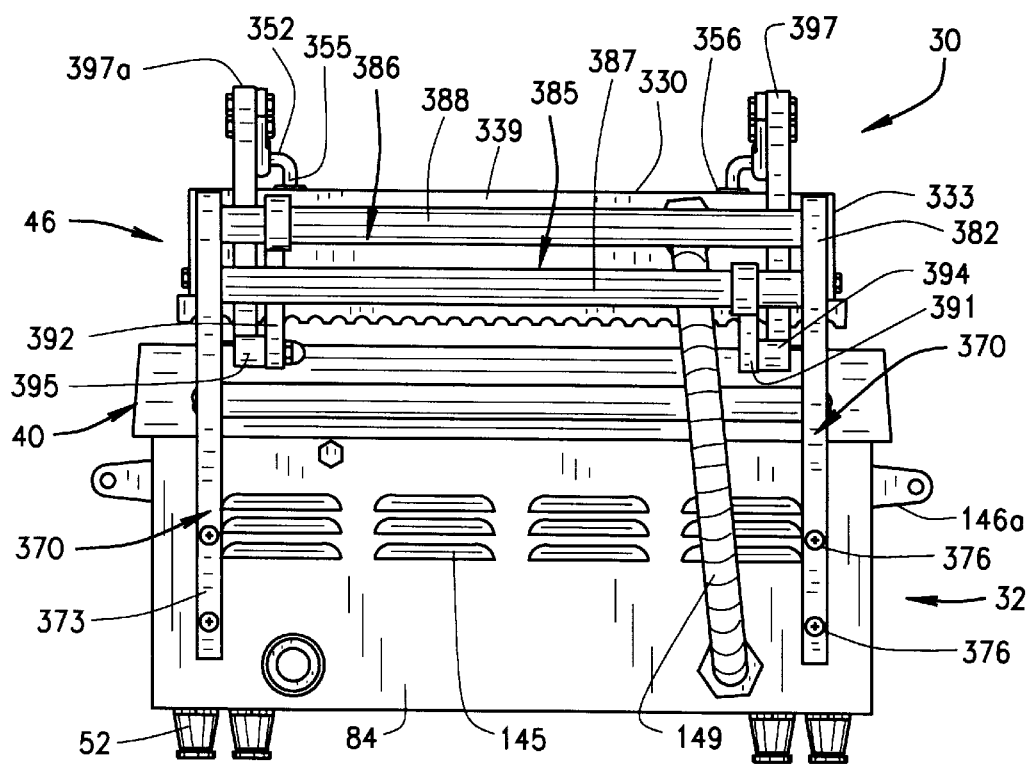
FIG. 4 is a rear elevation of the assembly of FIG. 1.
Figure 10:
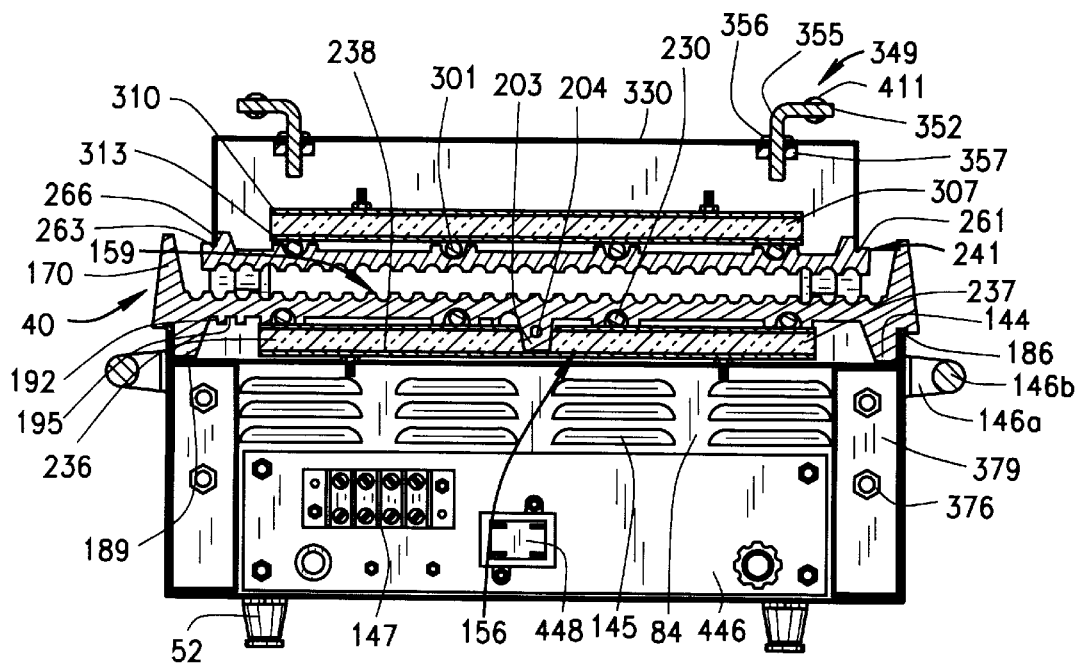
FIG. 10 is a cross-sectional view of the assembly taken along the plane of line 10—10 of FIG. 5.

The upper ends of the housing sidewalls 82, rear wall 84, and front wall section 140 bend upwardly thence downwardly for a sharp U-bend, then project horizontally inwardly into support ledge flanges 144, as is best illustrated in FIG. 2. Ledges 144 support the lower platen, as will be described. The ledge 144 extending from front wall section 140 has a gap having a width about equal to the width of front wall opening 90. The bottom edges of the sidewalls 82, rear wall 84, and the front wall lower section 137 all have inwardly extending offset flanges 143 which are secured as by screws to the floor 50. Vent holes 145 can extend through walls 82 and 84, such as depicted for the holes 145 in rear wall 84, as illustrated in FIGS. 4 and 10. Angled brackets 146a have their proximal ends secured to sidewalls 82 as by screws. Handle bars 146b of wood or plastic are secured as by screws to the distal ends of brackets 146a, so that assembly 30 can be moved with convenience.

An electrical terminal plate 147 is mounted to the inside of rear wall 84. An electrical cord 148 extends through a hole in rear wall 84 to be connected to terminal plate 147. Electrical wires extend from terminal plate 147 to extend through a flexible sheath 149, such as a plastic flexible sheath, to the upper platen ensemble 43, as will be described. The flexible sheath 149 is used to provide a watertight seal or enclosure around the electrical wires.

Figure 16:
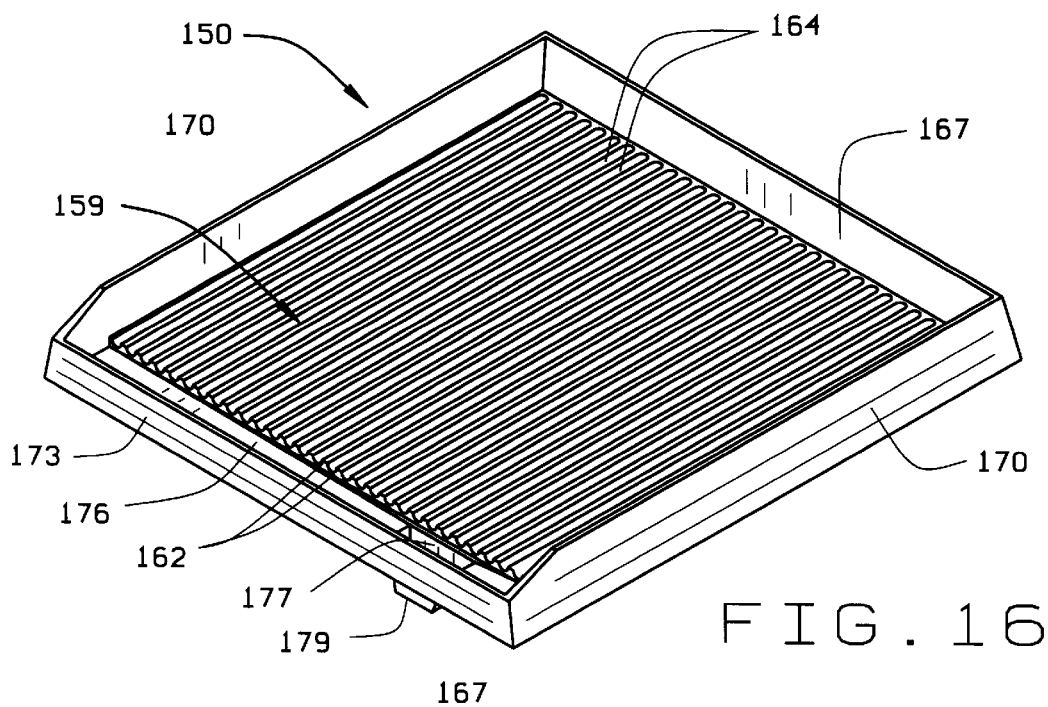
FIG. 16 is an isolated orthogonal projection of the lower platen.
Figure 17:
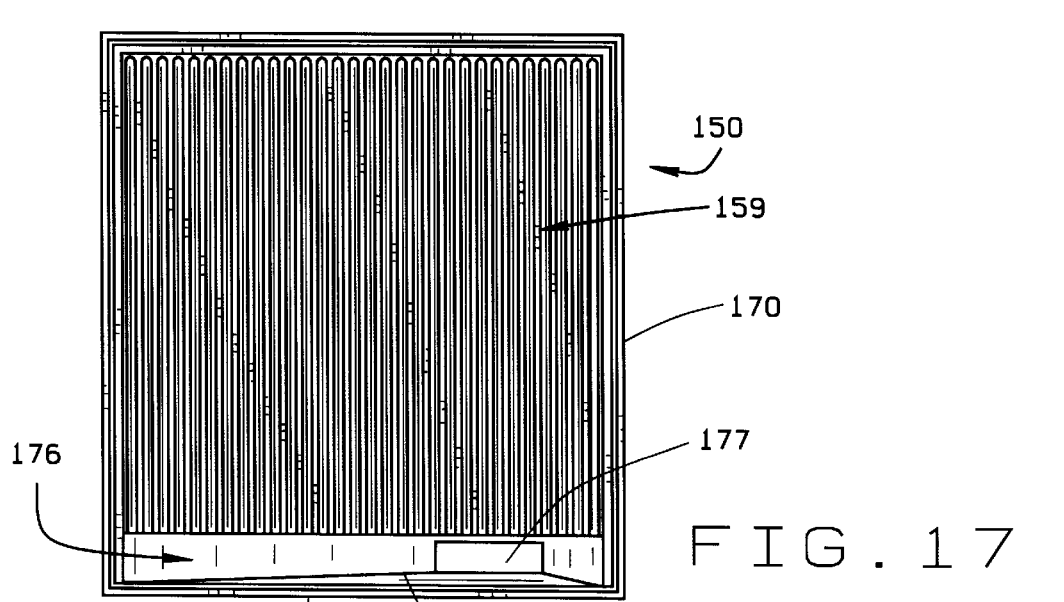
FIG. 17 is a top plan view of the lower platen of FIG. 16.
Figure 18:
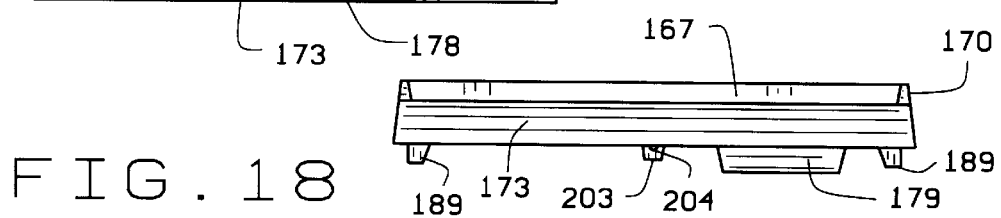
FIG. 18 is a front elevation of the lower platen of FIG. 16.

The lower platen ensemble 40, which is depicted in FIG. 2, comprises a lower grill platen 150 which can be made of metal, such as cast iron or cast aluminum. Ensemble 40 further comprises a heating element 153 as well as an insulation panel 156. The grill platen 150 has an approximately horizontal upper surface or grill surface 159, as shown in FIGS. 16 and 17, which is fluted to have a plurality of grooves 162 of semicircular cross section, spaced from each other by approximately horizontal flat ridges 164, as depicted in FIG. 10. Alternatively, the grill surface 159 could be smooth and flat, and approximately horizontal.

The lower platen 150 has at the rear of its upper surface 159 an integral vertically extending wall 167. Wall 167 integrally joins two vertical sidewalls 170 that extend along the outer edges of grill surface 159. Toward the front end, the sidewalls 170 slope at an angle downwardly to integrally join a vertical front wall 173. Front wall 173 is of lesser height than walls 167 and 170 to allow greater convenience of the operator in using a spatula or the like to place food on, or remove food from, the grill surface 159. Additionally, the wall 167 and the sidewalls 170, which are integral with the lower platen 150, serve as splash guards to prevent grease or water from splashing out of the lower platen 150. Between wall 173, and the front edge of grill surface 159, is a trough recess 176. The trough 176 receives grease or fluids that drain from the grooves 162 of grill surface 159. Toward the right of trough 176 (from the perspective of FIGS. 16 and 17) there is a trough drain opening 177 that extends through the platen 150. The surfaces of the trough 176 to the left of opening 177, and to the right of opening 177, both slope downwardly toward opening 177 to facilitate drainage. The front trough surface 178 is also the rear surface of the front wall 173. Surface 178 slopes toward opening 177, as seen in FIG. 17. A drain downspout 179 depends integrally from the lower platen 150 (FIGS. 11, 16, 18, and 19). Spout 179 has slanted sides which taper inwardly from its top to its bottom. The spout 179 has a rectangular opening 183 that is aligned with trough opening 177. When the drip tray 59 is fully inserted to the position of FIGS. 1, 5 and 7, the tray 59 is positioned to be beneath downspout 179 to receive drippings from the trough 176 which pass through tray housing opening 68.

Figure 19:
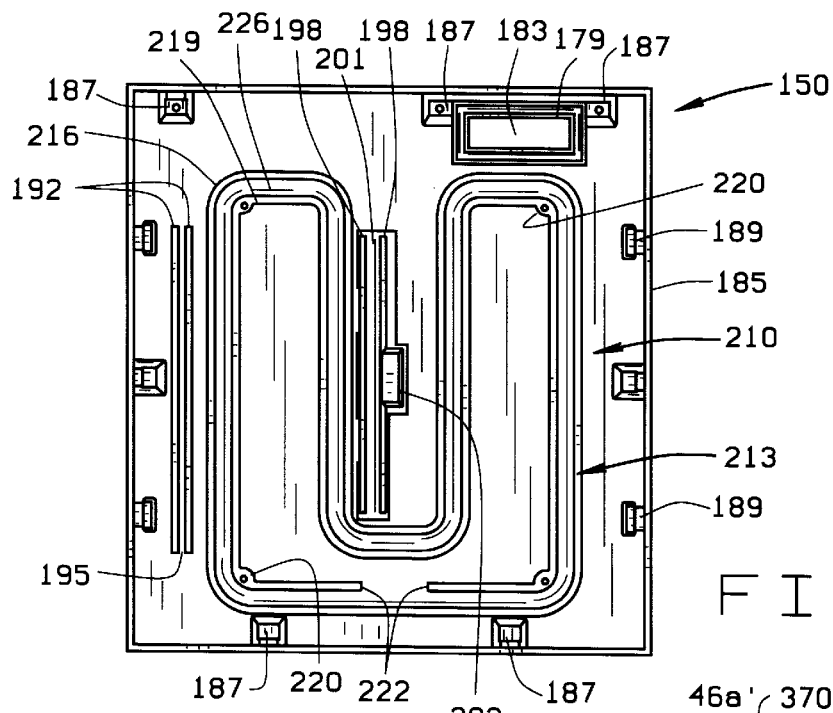
FIG. 19 is a bottom plan view of the lower platen of FIG. 16.

Looking now at the bottom portion of platen 150, as seen in FIG. 19, platen 150 has a generally flat undersurface 182. About the outer edge of undersurface 182 is a downwardly facing flat perimeter strip 185. Just to the inside of strip 185 is a notch 186 that extends about the perimeter of platen 150 and is slightly wider than the top ends of the sidewalls 82, rear wall 84, and front wall 140 (FIGS. 10 and 11) to snugly receive same, so that platen 150 is supported by base housing 32. The snug fit of the top ends of walls 82, 84, and 140 within notch 186 provides a watertight seal so that, for example, water used to clean assembly 30 is prevented from seeping through such interface to enter the area about the heating element 153.

Located immediately inwardly thereof are a plurality of lugs 187 and 189. As seen in FIGS. 10–11, the lugs 187 and 189 are positioned to fit adjacent the inside surfaces of the walls 82, 84, and 140 so that the bottom of lugs 187 and 189 can rest on the horizontal support ledges 144 to help support lower platen 150 and to provide support against lateral movement. To secure platen 150 to housing 32, bolts can pass through the ledge 144 at the front of casing 80, into threaded bores extending through the platen lugs 187 at the front of platen 150 (FIG. 11)

From the view of FIG. 19, to the left side of platen surface 182 are two raised walls 192 with a valley 195 formed therebetween for receiving the thermostat sensor tube 99. This thermostat mounting arrangement with walls 192 is configured for mounting a longer type of electromechanical sensor 99. A second thermostatic sensor mounting means is also provided with a pair of ridges 198 which project from surface 182 with a valley 201 formed therebetween, so that a smaller type of electromechanical sensor can be received therein. A central lug 203 projects downwardly from surface 182 adjacent the ridges 198. Lug 203 penetrates the insulation panel 156 as will be described. As seen in FIG. 10, lug 203 has a cylindrical bore 204 for receiving an electronic thermostatic sensor connected by an electrical wire to control box 104, which sensor could be used for greater accuracy in readings in substitution for the larger sensor 99 which is of an electromechanical structure. An example of such an electronic sensor is as from Durex Industries, 190 Detroit Street, Cary, Ill. 60013, having Model No. DC31759; or from Antronics Engineering, Ltd., 4658-215B Street, Langley, British Columbia, Canada, having Model No. V3A 8G7.

The platen lower surface 182 also has a means 210 for receiving the heating element 153. The means 210 comprises the surface 182 and a U-shaped mount 213. The mount 213 is formed by an outer raised ridge 216 which projects downwardly and extends in a U-shape continuously about undersurface 182. The mount 213 also comprises an inner ridge 219 that projects downwardly from undersurface 182. Ridge 219 extends equidistantly from ridge 216 in a U-shape, and has two ends 222 that are spaced from each other at the bottom of the U-shape. A cavity 226 is formed between the two ridges 216 and 219. Cavity 226 has a semi-circular cross section, as can be seen in FIG. 10. The inner ridge 219 has four bosses 220 at the inside of its exterior corners. The bosses 220 have threaded bores for receiving bolts for holding the insulation panel 156 to platen 150.

The heating element 153 comprises a rigid metal heating section 230 having a general U-shape conforming to the U-shape of ridges 216 and 219, and of cavity 226. Heating section 230 can be made of metal known in the art. Heating element 153 has two ends 231, and further comprises two electrically conducting terminal wires 232 that are each connected to the ends 231. Heating element 153 is installed by placing it so that its rigid heating section 230 fits totally within the valley 226 to allow the outer surfaces of ridges 216 and 219 to extend approximately even with or slightly beyond the tangential surface of element section 230. With the element 153 so installed, its ends 231 extend between the two ends 222 of inner mount ridge 219 of the surface 182.

With reference again to FIG. 2, the insulation panel 156 of lower platen subassembly 40 is comprised of a rectangular prism-shaped block 236 of insulating material, such as high temperature fiberglass. Insulation panel 156 also comprises a lower sheet 237 and an upper sheet 238, which can both be of metal such as aluminized steel. Panel sheets 237 and 238 both have rectangular front and rear slots 239 of equal size and shape which are located in alignment with each other. The front slots 239 accommodate passage of the element terminal wires 232. The presence of the slots 239 at the front and rear ends of the sheets allow the sheets 237 and 238 to be installed with either end to the front or rear of the assembly 30. Upper sheet 238 further has a central rectangular hole 240 for receiving the lug 203, as will be explained. The heating element terminals 232 pass through the front slots 239 in sheets 237 and 238, to be connected to wires that connect to terminal plate 147. Bolts extend through washers and holes located in the corners of the sheets 237 and 238, and through block 236, and are screwed into the bores in the bosses 220 on the platen undersurface 182. Such mounting holds the panel 156 in the position such as illustrated in FIG. 10 to press it toward the platen undersurface 182, so that the upper surface of sheet 238 rests approximately flush against the outer surfaces of ridges 216 and 219 to thus encapture the heating element section 230 within mount valley 226 and within the ridges 216 and 219. The central platen lug 203 extends through the opening 240 in sheet 238 and through block 236, to press against the upper surface of panel sheet 237, as seen in FIG. 10.

Attention is now directed to the construction of the upper platen ensemble 43 which is best illustrated in FIG. 2. The ensemble 43 comprises an upper grill platen 241, an upper heating element 243, an upper insulation panel 246, and an upper casing 249. When the ensemble 43 is assembled, heating element 243 is above platen 241, the insulation panel 246 is secured to platen 241 above element 243, and the lower platen 241 is secured to casing 249 so that casing 249 houses panel 246 and element 243.

As seen in the isolated views of FIGS. 12–15, the platen 241 has an upper surface 253 which is generally flat but with certain projections and recesses as will be described. About platen upper surface 253 there extends an upright rear wall 256 which integrally joins sidewalls 258, while sidewalls 258 integrally join a front wall 260. Each of the walls 256, 258, and 260 are set back from the upper edge of platen surface 253 so that a flat surfaced perimeter ledge 261 of equal width extends up to the lower outside edge of each of the walls 256, 258, and 260. To the inside of the flat ledge 261 is a perimeter groove 263, as seen in FIG. 10, which has a width to snugly receive the lower edges of each of the outer walls of casing 249 as will be described. Near each of the four corners of upper surface 253, overlying adjacent sidewalls 258, are upstanding mounting lugs 264. The outer surfaces of lugs 264 are co-extensive with the outer surfaces of corresponding sidewalls 258. The outer surfaces of lugs 264 have threaded bores to receive screws that extend through the sides of casing 249 to mount platen 241 to the casing 249.

Buttress lugs 266 overlie each of the sidewalls 258 at the middle thereof, with their outer surfaces co-extensive with the outer surfaces of sidewalls 258. Similar buttress lugs 268 overlie rear wall 256 and front wall 260 near the corners thereof, so that the front surfaces of lugs 268 are co-extensive with the outer surfaces of corresponding walls 256 and 260.

Within the perimeter walls 256, 258, and 260 is a means 270 for receiving the heating element 243. The means 270 is similar to the means 210 for receiving element 153 of lower platen assembly 40. The means 270 comprises a U-shaped mount 273 that extends about upper platen surface 253. Mount 273 has a U-shaped outer elevated ridge 276 and a U-shaped inner elevated ridge 279 that is equidistant from outer ridge 276. A U-shaped valley 282 of semi-circular cross section is formed between the ridges 276 and 279. The inner ridge 279 has four bosses 285 located to the inside of its exterior corners. The bosses 285 have threaded bores for receiving screws to hold the insulation panel 246 to platen 241.

The inner ridge 279 terminates into two ends 288, so that a space is formed therebetween through which terminals of the heating element 243 can pass. The distance between the parallel parts of inner ridge wall 279 that forms each of the legs of the U-shape is approximately the same as the distance between the parallel parts of outer ridge 276 that are in the middle of the legs of the U-shaped mount 273. This spacing facilitates even distribution of heat from element 243 to the platen 241.

Figure 13:
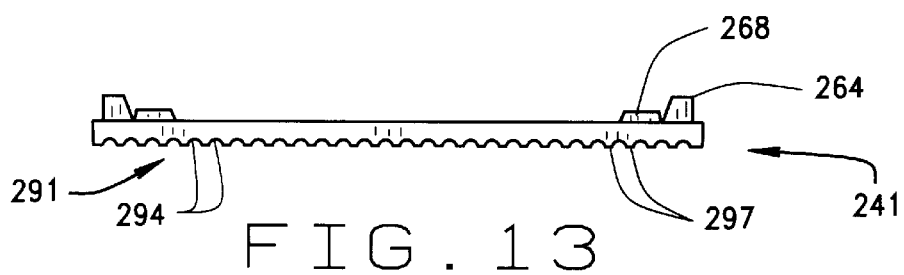
FIG. 13 is a front elevation of the upper platen of FIG. 12.
Figure 14:
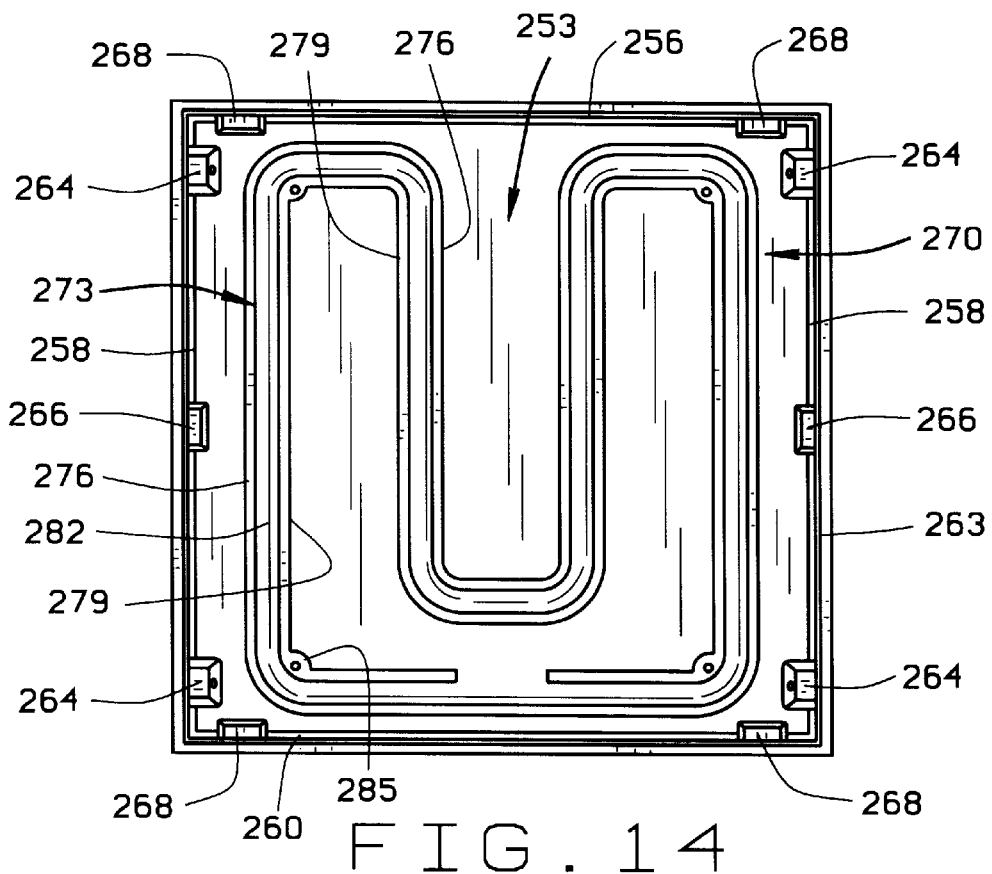
FIG. 14 is a top plan view of the upper platen of FIG. 12.
Figure 15:
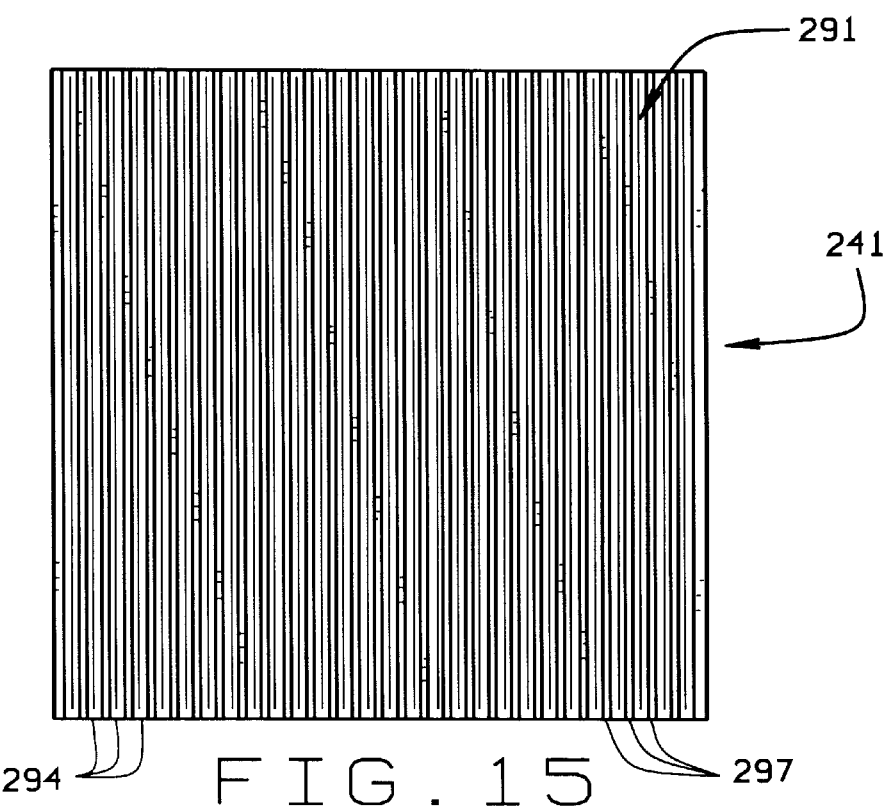
FIG. 15 is a bottom plan view of the upper platen of FIG. 12.

Looking now at the bottom of platen 241, as seen in FIGS. 13 and 15, platen 241 has an approximately horizontal lower surface 291 which is fluted to have a plurality of grooves 294 of semi-circular cross sections. Grooves 294 are spaced from each other by downwardly projecting approximately horizontal flat surfaced ridges 297. The spacing between the flat ridges 297 is approximately the same as the spacing between the flat ridges 164 of upper platen 150. Alternately, the lower platen surface 291 could be smooth and flat, and approximately horizontal, to match the previously described alternative smooth surface 159 of lower platen 150. The platen 241 may be formed from metal such as cast iron or cast aluminum.

The heating element 243, like element 153, has a heating section 301 with two ends that terminate into terminals 303. Heating section 301 has a circular cross section. The heating element section 301 also has a U-shape. As seen in FIG. 10, the diameter of heating section 301 is such that it can be received within the semi-circular cross section valley 282 of heating element receiving means 270.

The upper insulation panel 246 has some similarity in construction with lower insulation panel 156. Upper panel 246 comprises a block 307 of insulation material having a rectangular prism shape of the same material as lower panel block 236. Panel 246 also comprises an upper sheet 310 and a lower sheet 313 which can be of metal such as aluminized steel. Both the upper sheet 310 and the lower sheet 313 have at the front and rear ends aligned rectangular slots 316 and 318, respectively, of similar size and shape, with both slots 316 and 318 being shown for the upper sheet 310 in FIG. 2. Upper sheet 310 has near its front right corner (from the FIG. 2 perspective) a terminal block 322. The heating element terminals 303 extend through the sheet slots 318 and 316 to connect with terminal block 322. Wires (not shown) are connected to the block 322 to extend to and through the sheath 149 to be connected to lower terminal plate 147. The presence of the slots 316 and 318 at the front and rear of sheets 310 and 313 allows for ease in installation, as the sheets will function the same if either of the slots faces frontward.

Near each of the four corners of the block 307 and sheets 310 and 313 are bores for receiving bolts that pass therethrough to be threaded into the bores in bosses 285 on platen upper surface 253. Washers can fit about said bolts on the upper surfaces of sheets 310 and 313. When the panel 246 is so secured, the lower sheet 313 fits against the flat upper surfaces of the ridges 276 and 279 of mount 273, as shown in FIG. 10. The upper tangential surface of heating element section 301 is approximately flush against the lower surface of sheet 313. The heating section 301 is located approximately in the center of the mount valley 282. In this mounted position, the space between the parallel parts of heating section 301 that form the U-shape are approximately equidistant. In other words, the space between the parallel parts of heating section 301 that form the legs of the U are approximately the same as the space between the parallel parts of the heating section 301 that forms the central part of the U-shape of section 301.

The casing 249 is secured, as mentioned earlier, to upper platen 241. Casing 249 has a generally rectangular prism shape with an upper roof wall 330 which extends integrally into two sidewalls 333. Roof wall 330 also extends integrally into a front wall 336 and a rear wall 339. The lower edges of walls 333, 336, and 339 snugly fit into the perimeter groove 263 that extends about the outer edge of upper platen surface 253. The inside surfaces of casing sidewalls 333 fit approximately flush against the outer surfaces of the platen sidewalls 258 and flush against the outer surfaces of lugs 264 and middle lugs 266 as well. The casing sidewalls 333 have bores therethrough which receive screws 342. The screws 342 are threaded into the bores of the upper platen lugs 264 to securely mount platen 241 to casing 249. The inside surfaces of the casing front wall 336 and rear wall 339 rest approximately flush against the outer surfaces of platen outer walls 256 and 260, respectively. The outer surfaces of lugs 268 likewise rest flush against the inner surfaces of casing walls 333 and 336. Such a snug fitting of the casing walls within groove 263 and against the platen walls 256, 258, and 260 provides for a watertight seal of casing 249 with platen 241. Such sealing prevents water from entering within to contact the heating element 243 when the assembly 30 is cleaned, such as with a hose or other water or fluid cleansing source. The lugs 264, 266, and 268 help to provide support against the casing 249 by engaging the casing walls, should there be any unusual lateral forces applied to casing 249.

With particular reference now to FIGS. 1–4 and 10, a pair of handle pivot mounts 349 have a general L-shape, with an upper horizontal leg 352 and an integral vertical leg 355. Mounts 349 are parts of the pivot handle sub-assembly 48. Each vertical leg 355 has an unitary annular disc 356 secured to it as by forging. Each vertical leg 355 extends through a bore in the roof wall 330 so that the lower surfaces of discs 356 rest flush on the upper surface of roof 330. The part of vertical leg 355 beneath disc 356 is threaded to receive a lock nut 357. The upper surface of each nut 357 fits tightly against the lower surface of roof 330 to hold the lower surface of each disc 356 pressed tightly against the upper surface of roof 330, to provide a watertight or water resistant seal about the roof bore through which leg 355 extends.

As will be described in more detail hereafter, the horizontal legs 352 of the pivot mounts 349 each extend through bores in handle lever rods of the pivot handle sub-assembly 48, to allow the casing 249 and the upper platen assembly 43 to pivot as they are raised and lowered.

Directing attention to the counterbalance assembly 46, generally, the lower end of counterbalance assembly 46 is rigidly mounted to the housing rear wall 84, while an upper pivotal end of assembly 46 is mounted to upper platen ensemble 43. This allows the operator to use the handle sub-assembly 48 to pivot platen ensemble 43 relative to lower platen ensemble 40, so that counterbalance assembly 46 can hold lower platen ensemble 40 to a selected position when the operator releases handle sub-assembly 48.

More specifically, counterbalance assembly 46 has a pair of lower bracket plates 370 on each of its sides. Each bracket 370 has a generally rectangular lower leg 373. Each leg 373 has a flat front surface that fits approximately flush against the outer surface of housing rear wall 84, as seen in FIGS. 5–10. A pair of screws 376 extend through each leg 373, thence through housing back wall 84 and thence through a reinforcing plate 379 (FIG. 10) which fits flush against the inside surface of housing wall 84. The screws 376 are secured by nuts which fit flush against the inside surfaces of plates 379. Each leg 373 extend upwardly into an enlarged, generally tapered hip section 382. A cross strut 383 has its ends non-movably secured to the lower part of each hip section 382 as by bolts.

Assembly 46 further comprises a plurality of counterbalance members, two such members 385 and 386 being illustrated. Each counterbalance member 385 and 386 can be of the structure such as designated C in U.S. Pat. No. 4,571,775. Said U.S. Pat. No. 4,571,775 is fully incorporated herein by reference. The outer sleeves 387 and 388 of the counterbalance members 385 and 386, respectively, can be seen in the drawings. Assembly 46 further comprises a pair of cam follower combinations 389 and 390, respectively, each of which includes a follower leg 391 and 392, respectively. Each follower leg 391 and 392 has an opening near its proximal end that receives an end of sleeve 387 and 388, respectively, so that each leg 391 and 392 is non-rotatably secured to its respective sleeve 387 and 388 in a fashion such as disclosed in U.S. Pat. No. 4,571,775. At the distal end of follower leg 391 and 392 is rotatably mounted a cylindrical cam follower 394 and 395, respectively. The counterbalance assembly 46 further comprises other components such as disclosed in said U.S. Pat. No. 4,571,775. Each counterbalance sleeve 387 and 388 has its ends rotatably mounted to sockets (not shown) such as designated 24 in U.S. Pat. No. 4,571,775. Such sockets are affixed to bracket hips 382 in the fashion the sockets 24 are secured to brackets 18 in U.S. Pat. No. 4,571,775. Within sleeves 387 and 388, the counterbalance members 385 and 386 each have the structure disclosed in said U.S. Pat. No. 4,571,775, including the elongated torsion member designated "D" in said patent, as well as adapters, such as designated 26, and an anchor such as designated 32, and a means for affixing the anchor non-rotatably with the sleeve "E" as disclosed in said U.S. Pat. No. 4,571,775.

A pivot cam arm 397 has a cylindrical bore that telescopically receives a cylindrical hub 398 that is mounted as by a pin 399 to the upper end of bracket hip section 382 of the bracket 370 positioned to the left of assembly 30 (as viewed from the perspective of FIG. 1). A cylindrical spacer of rubber, plastic or the like fits about pin 399 between arm 397 and said bracket section 382. Arm 397 can pivot about hub 398. The lower end of arm 397 has a convex cam surface 400 which extends upwardly into a concave cam surface 401. The rotatable cam follower 394 can engage surfaces 400 and 401 to roll therealong. A stop 402 adjacent to concave surface 401 projects from arm 397 to stop movement of cam follower 394 therebeyond.

A second pivot arm 397a, like arm 397, has a cylindrical bore that telescopically and rotatably receives a cylindrical hub 398a mounted by a pin 399a to the bracket hip 382 located to the right of FIG. 1. The lower end of arm 397a has a convex cam surface 400a which extends upwardly into a concave cam surface 401a. A stop 402a extends from arm 397a adjacent concave surface 401a. Cam follower 395 can engage surfaces 400a and 401a to roll therealong, with stop 402a acting to stop movement of cam follower 395 therebeyond. A cylindrical spacer can also fit about pin 399a between arm 397 and its adjacent bracket hip 382.

A stop or catch rod 403 is mounted to the outside surface near the top of the hip section 382 that is located to the right of assembly 30, from the FIG. 1 perspective. The catch rod 403 has a proximal end 404 that has a flat inner surface that fits flush against the flat outer surface of the hip section 382, to which it is mounted as by a pair of bolts 405. Each rod 403 has a tubular extension 406 that has a generally L-shape, with its proximal end joined to section 404, and its distal end bending into horizontally extending foot section 407. As seen in FIGS. 9 and 9A, when the upper platen upper surface 253 is in an approximate vertical orientation relative to lower platen upper surface 159, the foot 407 of catch rod 403 engages the casing roof wall 330 to resist further pivotal movement of upper platen ensemble 43 in a clock-wise direction (from the perspective of FIG. 9). Such engagement holds the upper platen surface 253 in such vertical orientation so that if water or liquid is sprayed thereon during a cleaning operation, such liquid will drip downwardly in the direction of the alignment with the approximately vertical surface 253, to drip upon the lower platen surface 159 and not spill toward the rear of the base housing 32 onto the surface of a counter or stand upon which the assembly 30 sits.

The counterbalance assembly 46 is engaged with the pivot handle sub-assembly 48. Handle sub-assembly 48 comprises a pair of lever rods 408. As can be seen in FIG. 7, each lever rod 408 comprises a proximal section 409 which has its flat proximal end secured by a pair of bolts 410 to the inside of the upper ends of each pivot arm 397 and 397a. Each proximal section 409 extends generally straight from its connection to arms 397 and 397a, thence bends upwardly into an intermediate section 411 which is likewise generally straight and of cylindrical cross-section. Intermediate section 411 extends to bend downwardly into a third distal section 414. The distal ends of section 414 fit within receptive bores of a handle grip bar 417, and are secured therein as by set screws 419. Bar 417 can be of plastic or wood to insulate from the heat of the assembly 30.

Figure 7A:
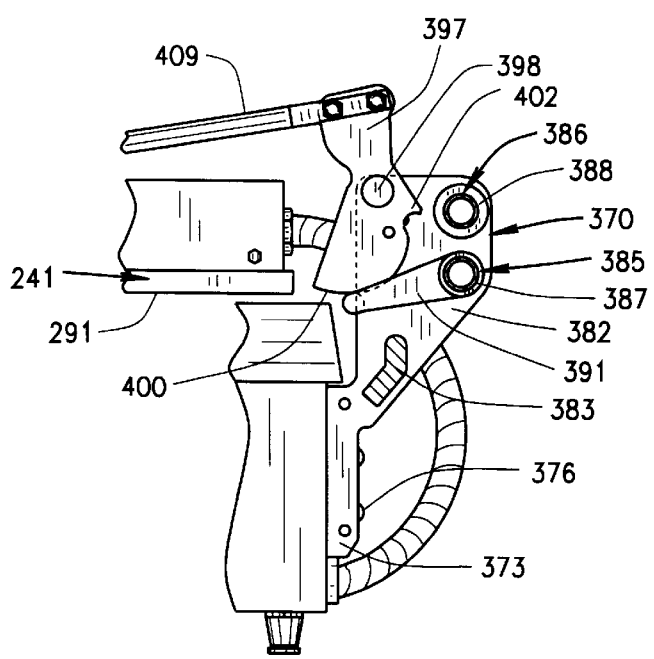
FIG. 7A is a side section similar to that of FIG. 7, but taken in partial section as to the counterbalance assembly, to better illustrate the counterbalance assembly structure toward the left side of FIG. 1, with the upper platen assembly in the same position as in FIG. 7.
Figure 8A:
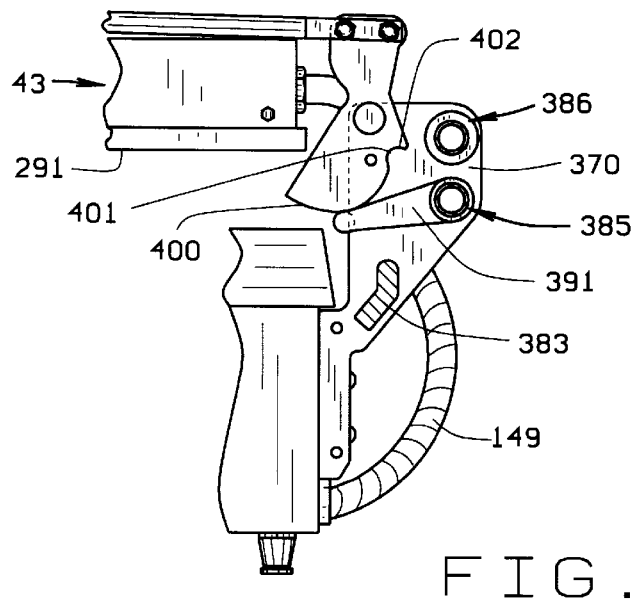
FIG. 8A is a side section similar to that of FIG. 8, but taken in partial section as to the counterbalance assembly, to better illustrate the counterbalance assembly structure toward the left side of FIG. 1, with the upper platen assembly in the same position as in FIG. 8.

The handle grip bar 417 can be grasped by the operator and lifted from the FIG. 7 and 7A position to, e.g., the FIG. 8 position. As the handle lever rods 408 are thereby pivoted upwardly, the upper platen ensemble 43 pivots about its connections to handle pivot mounts 349. Thus, it can be seen from viewing FIGS. 7, 7A, 8, and 8A, that the lower grill surface 291 of upper platen 241, which is substantially parallel to the upper surface 159 of lower platen 150 in the FIGS. 7 and 7A position, remains in such substantially parallel relationship in the FIGS. 8 and 8A position. In the FIGS. 8 and 8A position, the two platen surfaces 159 and 291 are approximately 3 inches apart. In the FIGS. 7 and 7A position, the two platen surfaces 159 and 291 are approximately 0.5 inch apart. Such a substantially parallel relationship of the two platen surfaces 159 and 291 is also maintained for the positions intermediate between the FIGS. 7 and 7A position and the FIGS. 8 and 8A position. The platen surfaces 159 and 291 also remain approximately horizontal in this range of movement. Thus food products of varying thicknesses, such as thin tortillas of 1/16 inch, to larger food products such as large burger patties or chicken breasts up to 3 in., can be placed between the platen surfaces 159 and 291 and cooked, with the advantage of having both platen surfaces 159 and 291 resting evenly against both the upper and lower surfaces of the food product for an even distribution of cooking heat.

Turning to the action of counterbalance assembly 46 during pivoting of the upper platen ensemble 43, reference is made to the FIGS. 9 and 9A position in which the upper platen ensemble 43 has been pivoted to its farthest position in a clockwise direction, as viewed looking at FIG. 9. In this FIGS. 9 and 9A position, it can be seen that the counterclockwise pivoting of platen ensemble 43 relative to catch rods 403 is resisted by the engagement of the platen casing upper surface 330 against the catch foot 407. In the FIGS. 9 and 9A position, it can be seen that the cam follower 394 rests against the concave cam surface 401 of pivot arm 397, with farther clockwise movement of arm 397 resisted by stop 402. Also in such position cam follower 395 rests against concave surface 401a of pivot arm 397a, with further clockwise arm movement resisted by stop 402a. In this FIGS. 9 and 9A position, there is very little twisting of the counterbalance torsion member contained within sleeve 386, since a substantial portion of the weight of platen ensemble 43 and handle sub-assembly 46 are resisted by the pivot hubs 398 and 398a, as ensemble 43 and sub-assembly 46 are approximately in a vertical orientation relative to hubs 398 and 398a. As the operator moves handle 417 downward and thereby pivots the platen ensemble 43 downwardly, each cam follower 394 and 395 rolls from its respective concave cam surface 401 and 401a toward and along their respective convex cam surfaces 400 and 400a. With such movement, each convex cam surface 400 and 400a pushes its respective follower 394 and 395 to rotate respective cam arms 397 and 397a in a counter-clockwise direction (from the perspective of FIG. 9). As the cam arms 397 and 397a rotate counterclockwise, they apply torque to respective sleeves 387 and 388. This develops counterbalancing torque resistance within counterbalance members 385 and 386, respectively, in the fashion disclosed in U.S. Pat. No. 4,571,775 so that the platen ensemble 43 will be maintained in the position it is in when the operator releases handle 417. Thus, when the operator pivots the handle 417 from the FIGS. 9 and 9A position to move platen ensemble 43 to the position of FIGS. 8 and 8A, the follower legs 391 and 392 pivot counterclockwise to the FIGS. 8 and 8A position. When the operator releases handle 417, each of the counterbalance members 385 and 386 apply a counterbalancing torque through cam legs 391 and 392, respectively, against pivot arms 397 and 397a, respectively, to resist further lowering of the platen ensemble 43 from its FIGS. 8 and 8A position. As can be seen, in the FIGS. 8 and 8A position each cam follower 394 and 395 has traveled along its respective convex cam surface 400 and 400a to be located nearer the lower end of said respective cam surface.

Likewise, when the operator pivots handle 417 to move the platen ensemble 43 from the FIG. 8 position to the FIG. 7 position, the follower legs 391 and 392 are rotated in a farther counter-clockwise direction. The pivot arms 397 and 397a are also pivoted farther in a counter-clockwise direction, so that the cam followers 394 and 395 have moved farther toward the lower end of respective cam surfaces 400 and 400a from the FIG. 8 and 8A position, to be positioned closer to the bottom of the bottom of the respective convex cam surfaces 400 and 400a in the FIG. 7 position.

Figure 21:
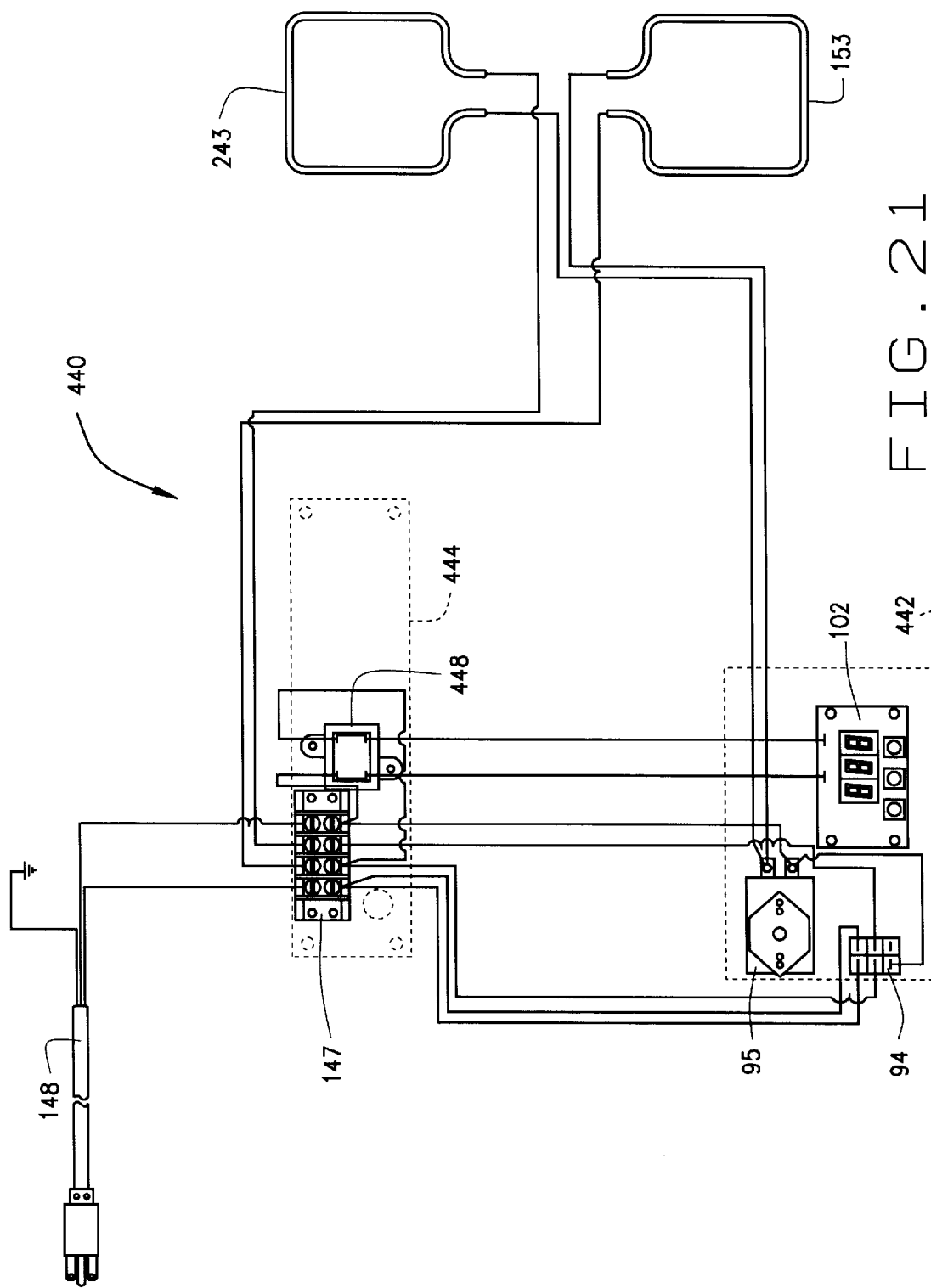
FIG. 21 is a schematic showing elements of the control subassembly and associated components.

Attention is now directed to the circuit diagram of FIG. 21. FIG. 21 shows previously identified circuit components and circuitry 440. Illustrated within the rectangular box 442, shown in dashed lines in the lower left of FIG. 21, are components that are mounted with the front mount plate 91 at front wall 86. These components comprise the toggle switch 94, the thermostat 95, and the timer 102. Another rectangular-shaped box 444 shows components mounted to the base housing back wall 84, which can be secured to a mount plate shown as 446 in FIG. 10. The components associated with the box 444 include the terminal plate 147, as well as a transformer 448, which is also shown affixed to plate 446 in FIG. 10. The connections of the wires of electrical cord 148 to plate 147 are further illustrated in FIG. 21. The connections of the wires to upper heating element 243, lower heating element 153, transformer 95, and terminal plate 147 are also illustrated. The transformer 95 is connected to toggle switch 94 as well. The toggle switch 94 can be placed in a position to complete circuitry to both the upper heating element 243 and lower heating element 153. Switch 94 can also be placed in a second position to complete the circuit through lower heating element 153, but not through upper heating element 243. Switch 94 can further be placed in a third "off" position whereby the circuitry is open to both lower and upper heating elements 153 and 243. Timer 102 can be set so that in the mode wherein both heating elements 153 and 243 are activated, or wherein only lower heating element 153 is activated, the time period during which the circuit is closed to such heating elements is controlled by the setting of the time period of timer 102 as selected by the operator. The thermostatic sensor, such as that illustrated as 99, can act with thermostat 95 to open or close the circuits through heating elements 153 and 243, depending upon the temperature setting for the thermostat 95, as selected by the operator. The circuitry 440 thus allows for controlled temperature settings and grilling times so that grill cooking can be performed by the lower heating element 153 and its associated lower platen 150, in tandem with upper heating element 243 and its associated upper platen 245, or by only lower element 153 and platen 150.

Figure 20:
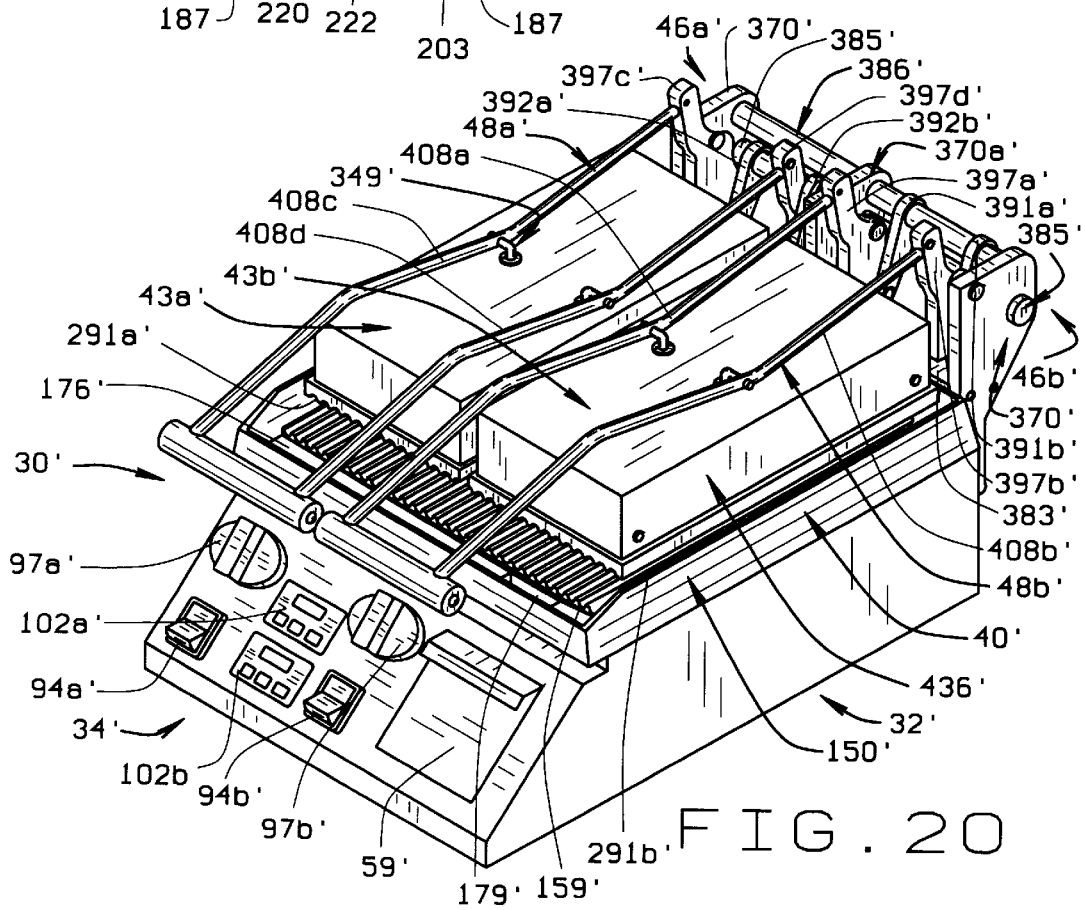
FIG. 20 is an orthogonal projection of a modified food grill assembly, wherein there are two separate upper platen subassemblies.

Turning now to the modification shown in FIG. 20, there is illustrated a modified assembly 30' wherein the upper platen arrangement is divided into multiple separate platens, with the embodiment illustrated showing two separate upper platen ensembles 43a' and 43b'. The assembly 30' also comprises a base housing 32', which has a control subassembly 34' and a drip tray subassembly 37'. A lower platen ensemble 40' is supported by base housing 32'. A counterbalance assembly 46' is mounted to the rear of housing 32' and is connected to a pair of pivot handle subassemblies 48a' and 48b'.

The structure and operation of assembly 30' is very similar to that of the heretofore described assembly 30. The lower platen ensemble 40' has a single lower grill platen 150' with upper surface 159', and trough recess 176' which opens into a downspout 179' to allow grease and the like to flow therethrough into the drip tray 59'.

Counterbalance assembly 46' comprises a pair of counterbalance subassemblies 46a' and 46b'. The counterbalance subassemblies have a first counterbalance member 386' connected to bracket plates 370' which are mounted at their lower ends to the back of base housing 32'. The brackets 370' are connected to the ends of cross strut 383'. A pair of cam follower legs 391a' and 391b' are mounted to counterbalance member 386'. Legs 391a' and 391b' have rotatable cam followers that travel along the cam surfaces of pivot cam arms 397a' and 397b', respectively. Cam arms 397a' and 397b' are pivotally mounted to brackets 370', and are connected to the proximal ends of handle lever rods 408a' and 408b', respectively.

A second counterbalance member 385' is also mounted to brackets 370'. Cam follower legs 392a' and 392b' are each secured to counterbalance member 385a'. Legs 392a' and 392b' have rotatable cam followers that travel upon cam surfaces of pivot cam arms 397c' and 397d', respectively. Cam arms 397c' and 397d' are connected at their tops to the proximal ends of handle lever rods 408c' and 408d', respectively. Cam arms 397c' and 397d' are pivotally mounted to a central bracket 370a'. Bracket 370a' has at its lower end an opening shaped to telescopically receive the cross strut 383' and can be secured therewith as by screws.

Each of the pivot handle subassemblies 48a' and 48b' can be operated to lift their corresponding upper platen ensembles 43a' and 43b', respectively, in the same fashion as heretofore described. Through such operation each ensemble 43a' and 43b' can be positioned so that the lower surfaces 291a' and 291b' of the upper platen ensembles 43a' and 43b' remain substantially parallel with the upper surface 159' of lower platen ensemble 40'. The counterbalance assembly 46' acts as previously described so that the positions of the upper platen ensembles 43a' and 43b' are maintained at the various selected positions. With this arrangement, food products of varying thicknesses can be grilled, with, e.g., a tortilla of 1/16 inch thickness placed beneath upper platen ensemble 43a', and a 3 inch meat patty placed beneath upper platen ensemble 43b'. A catch (not shown) of the same structure as catch rod 403 can be mounted to each bracket 370' to hold the lower surface 291a and 291b approximately vertical in relation to lower platen upper surface 159', in the same fashion as illustrated in FIG. 9.

The control subassembly 34' comprises a pair of toggle switches 94a' and 94b', and thermostat control knobs 97a' and 97b' which operate thermostat control boxes connected to sensor tubes (not shown). The sensor tubes are connected (in the manner previously described as to platen ensemble 43), with corresponding upper platen ensembles 43a' and 43b', respectively. The control subassembly 34' also comprises timers 102a' and 102b'. With reference to the circuitry of FIG. 21, it can be understood that the circuitry for the modification of FIG. 20 is such that toggle switch 94a' can be operated to complete the circuit through the heating element corresponding to upper platen ensemble 43a' as well as the lower platen ensemble 40' to cook food products located therebetween. The temperature with regard to heating platen ensemble 43a' can be controlled by thermostat knob 97a', while the time for grilling can be controlled by timer 102a', respectively. Switch 94a' can also be positioned to open the circuit through the heating element of ensemble 43a' so that ensemble 43a' provides no heat, but the lower platen ensemble 40' is heated. Likewise, the upper platen ensemble 43b' can have the circuit to its heating element controlled to be opened or closed by switch 94b', while thermostat control knob 97b' can control the temperature setting therefor when the circuit is closed, and the timer 102b' can be set to control the time for the heating elements to be heated. Both switches 94a' and 94b' can be in an "off" position so that no current is supplied to the lower platen ensemble 40', or to the upper platen ensemble 43a' or 43b', respectively.

As can be appreciated from the above, the assembly 30 may be operated in the following manner. The toggle switch 94 is operated to either turn on the heating element 153 associated with the lower platen ensemble 150 or turn on both the heating element 153 and the heating element 243. Additionally, the temperature to be used to cook food is selected by operation of the knob 97 and the time required to cook the food product is selected by operation of the timer 102. The upper platen ensemble 43 is lifted by use of the handle 417 of the pivot handle sub-assembly 48 and the counterbalance assembly 46 acts to hold the upper platen ensemble 43 in an upright position. Once a food product has been placed on the lower platen assembly 40 to be cooked, the handle 417 is used to bring the upper platen ensemble 43 down into a position in which the upper grill platen 241 may come into contact with the food product. After the timer 102 has timed out indicating that the cooking time for the food product has expired, the handle 417 is again used to lift up the upper platen ensemble 43. The food product may be removed by using a spatula or other similar device and another food product may be placed on the lower platen assembly 40 to be cooked.

Additionally, the assembly 30' may be operated in a similar manner as that of the assembly 30 with a significant difference being that two different food products may be cooked at the same time. For example, a chicken breast may be cooked beneath the upper platen ensemble 43a' and a tortilla may be cooked beneath the upper platen ensemble 43b'. Further, the cooking times for the two different food products may be independently controlled by use of the timers 102a' and 102b'.

From all that has been said, it will be clear that there has been shown and described herein a food grill assembly which fulfills the various objects and advantages sought therefor. It will be apparent to those skilled in the art, however, that many changes, modifications, variations, and other uses and applications of the subject food grill assembly are possible and contemplated. All changes, modifications, variations, and other uses and applications which do not depart from the spirit and scope of the invention are deemed to be covered by the invention, which is limited only by the claims which follow.

What is claimed is:

1. A food grill assembly for cooking a food product comprising a base, a lower platen ensemble associated with the base, the lower platen ensemble having a heat source and a surface upon which a food product to be cooked is placed, the lower platen ensemble further comprising a back wall and a pair of side walls which are integral with the lower platen ensemble with the walls forming a splash guard, an upper platen ensemble having a heat source, the upper platen ensemble having a surface which is adapted to be in contact with a food product to be cooked, a counterbalance assembly connected to the base, and a handle mechanism connected to the counterbalance assembly and the upper platen ensemble for providing pivoting movement of the upper platen assembly relative to the base, the counterbalance assembly for leveling the upper platen assembly relative to the lower platen assembly when the upper platen assembly is within a predetermined distance from the lower platen assembly.

2. The food grill assembly of claim 1 wherein the lower platen ensemble comprises a lower grill platen having a top grill surface and a bottom surface, the bottom surface having a recess for receiving a heating element.

3. The food grill assembly of claim 2 wherein the lower platen ensemble further comprises a trough recess for receiving grease or fluids that drain from the top grill surface and a trough drain for draining grease or fluids from the trough recess.

4. The food grill assembly of claim 3 further comprising a drip tray associated with the base and aligned with the trough drain, the drip tray for receiving grease or other matter from a food product being cooked.

5. The food grill assembly of claim 1 wherein the upper platen ensemble comprises an upper grill platen having a bottom grill surface and a top surface, the top surface having a recess for receiving a heating element, with the upper grill platen and the heating element secured within an upper casing.

6. The food grill assembly of claim 1 further comprising a stop connected to the counterbalance assembly, the stop for limiting pivoting movement of the upper platen ensemble.

7. The food grill assembly of claim 1 wherein the handle mechanism comprises a pair of handle pivot mounts which are connected to the upper platen ensemble, the handle pivot mounts each comprising an annular disc for providing a water resistant seal about the upper platen ensemble.

8. The food grill assembly of claim 1 wherein the predetermined distance is about three inches.

9. A food grill assembly for cooking a first food product have a first thickness and a second food product having a second thickness, the food grill assembly comprising a base, a lower platen ensemble associated with the base, the lower platen ensemble having a heat source and a surface upon which a food product to be cooked is placed, an upper platen ensemble having a heat source, the upper platen ensemble having a surface which is adapted to be in contact with a food product to be cooked, a counterbalance assembly connected to the base, a handle mechanism connected to the counterbalance assembly and the upper platen ensemble for providing pivoting movement of the upper platen assembly relative to the base between a first position which is capable of cooking a first food product having a first thickness and a second position which is capable of cooking a second food product having a second thickness, and a stop connected to the counterbalance assembly, the stop for limiting pivoting movement of the upper platen ensemble.

10. The food grill assembly of claim 9 wherein the lower platen ensemble comprises a lower grill platen having a top grill surface and a bottom surface, the bottom surface having a recess for receiving a heating element.

11. The food grill assembly of claim 10 wherein the lower platen ensemble further comprises an edge which mates with the base to form a water tight seal.

12. The food grill assembly of claim 10 wherein the recess comprises a U-shaped mount that extends about the bottom surface, the mount having a U-shaped outer elevated ridge and a U-shaped inner elevated ridge that is equidistant from the outer ridge.

13. The food grill assembly of claim 9 wherein the upper platen ensemble comprises an upper grill platen having a bottom grill surface and a top surface, the top surface having a recess for receiving a heating element, the upper grill platen and the heating element secured within an upper casing, the upper grill platen and the upper casing having a water tight seal.

14. The food grill assembly of claim 13 wherein the recess comprises a U-shaped mount that extends about the top surface, the mount having a U-shaped outer elevated ridge and a U-shaped inner elevated ridge that is equidistant from the outer ridge.

15. The food grill assembly of claim 9 wherein the lower platen ensemble further comprises a lower grill platen having a top grill surface and a bottom surface, the bottom surface having a recess formed therein for receiving a heating element, a trough recess for receiving grease or fluids that drain from the top grill surface, and a trough drain for draining grease or fluids from the trough recess.

16. The food grill assembly of claim 9 further comprising an electrical conduit connected between the upper platen ensemble and the lower platen ensemble, the conduit being housed within a plastic flexible sheath.

17. A food grill assembly for cooking two or more food products comprises a base, a lower platen ensemble associated with the base, the lower platen ensemble having a heat source, a surface upon which a food product to be cooked is placed, and a back wall and a pair of side walls which are integral with the lower platen ensemble with the walls forming a splash guard, a first upper platen ensemble having a heat source, the first upper platen ensemble having a surface which is adapted to be in contact with a food product to be cooked, a second upper platen ensemble having a heat source, the second upper platen ensemble having a surface which is adapted to be in contact with a food product to be cooked, a first counterbalance assembly connected to the base, a second counterbalance assembly connected to the base, a first handle mechanism connected to the first counterbalance assembly and the first upper platen ensemble for providing pivoting movement of the first upper platen assembly relative to the base, and a second handle mechanism connected to the second counterbalance assembly and the second upper platen ensemble for providing pivoting movement of the second upper platen assembly relative to the base.

18. The food grill assembly of claim 17 wherein the lower platen ensembles further comprises a lower grill platen having a top grill surface and a bottom surface, the bottom surface having a recess for receiving a heating element.

19. The food grill assembly of claim 18 wherein the lower platen ensemble further comprises a trough recess for receiving grease or fluids that drain from the top grill surface, a trough drain for draining grease or fluids from the trough recess, and a grease tray mounted on a front portion of the base and aligned with the trough drain for receiving and collecting grease or fluids.

20. The food grill assembly of claim 17 wherein each of the upper platen ensembles comprises an upper grill platen having a bottom grill surface and a top surface, the top surface having a recess for receiving a heating element, with the upper grill platen and the heating element secured within an upper casing.

\* \* \* \* \*

UNITED STATES PATENT AND TRADEMARK OFFICE
CERTIFICATE OF CORRECTION

PATENT NO. : 6,257,126 B1                                         Page 1 of 1
DATED : July 10, 2001
INVENTOR(S) : Velijkovic et al.

It is certified that error appears in the above-identified patent and that said Letters Patent is hereby corrected as shown below:

Column 5,
Line 4, replace "number identifies" with -- number 30 identifies --

Column 6,
Line 54, replace "filly" with -- fully --

Column 8,
Line 54, replace "comers" with -- corners --

Signed and Sealed this

Twenty-seventh Day of November, 2001

Attest:

*Nicholas P. Godici*

NICHOLAS P. GODICI
*Attesting Officer*      *Acting Director of the United States Patent and Trademark Office*